(12) United States Patent
Hurd et al.

(10) Patent No.: US 11,026,475 B2
(45) Date of Patent: Jun. 8, 2021

(54) FLEXIBLE FLUID-FILLED CHAMBER WITH TENSILE MEMBER

(71) Applicant: NIKE, Inc., Beaverton, OR (US)

(72) Inventors: John Hurd, Lake Oswego, OR (US); Levi J. Patton, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 968 days.

(21) Appl. No.: 15/259,849

(22) Filed: Sep. 8, 2016

(65) Prior Publication Data

US 2018/0064208 A1    Mar. 8, 2018

(51) Int. Cl.
| | |
|---|---|
| *A43B 13/20* | (2006.01) |
| *B29D 35/12* | (2010.01) |
| *A43B 13/04* | (2006.01) |
| *A43B 13/12* | (2006.01) |
| *A43B 13/14* | (2006.01) |
| *A43B 13/18* | (2006.01) |
| *A43B 13/22* | (2006.01) |
| *A43B 13/32* | (2006.01) |
| *A43C 15/16* | (2006.01) |

(52) U.S. Cl.
CPC .............. *A43B 13/20* (2013.01); *A43B 13/04* (2013.01); *A43B 13/125* (2013.01); *A43B 13/141* (2013.01); *A43B 13/186* (2013.01); *A43B 13/188* (2013.01); *A43B 13/223* (2013.01); *A43B 13/32* (2013.01); *A43C 15/16* (2013.01); *B29D 35/122* (2013.01)

(58) Field of Classification Search
CPC ..... A43B 13/20; A43B 13/141; A43B 13/223; A43B 13/125; A43B 13/186; A43B 13/188; A43B 13/04; A43B 13/32; B29D 35/122; A43C 15/16

USPC .............. 36/28.29; 2/24; 12/146 BC, 146 B; 156/145

See application file for complete search history.

(56) References Cited

U.S. PATENT DOCUMENTS

| | | | | |
|---|---|---|---|---|
| 2009/0288312 A1* | 11/2009 | Dua | .................. | A43B 1/04 36/29 |
| 2012/0233878 A1* | 9/2012 | Hazenberg | ............. | A43B 13/20 36/29 |
| 2013/0263391 A1* | 10/2013 | Chao | .................... | A43B 13/18 12/146 B |

(Continued)

*Primary Examiner* — Khoa D Huynh
*Assistant Examiner* — Abby M Spatz
(74) *Attorney, Agent, or Firm* — Honigman LLP; Matthew H. Szalach; Jonathan O'Brien

(57) ABSTRACT

A method of making an article of footwear. The method may include forming a chamber for receiving a pressurized fluid, including a first chamber barrier layer, a second chamber barrier layer, and a tensile member extending between the first chamber barrier layer and the second chamber barrier layer. The tensile member may include a first tensile member layer, a second tensile member layer, and a plurality of tethers connecting the first tensile member layer to the second tensile member layer. The method may also include extending a portion of the second chamber barrier layer toward the first tensile member layer between a first section of the second tensile member layer and a second section of the second tensile member layer, and joining the portion of the second chamber barrier layer to the first tensile member layer between the first section and the second section of the second tensile member layer.

23 Claims, 17 Drawing Sheets

(56) References Cited

U.S. PATENT DOCUMENTS

2014/0053427 A1\* 2/2014 Patton ................ A43B 13/189
  36/29
2015/0208759 A1\* 7/2015 Hazenberg ............ A43B 13/20
  12/146 B \* cited by examiner

FLEXIBLE FLUID-FILLED CHAMBER WITH TENSILE MEMBER

FIELD

The present invention relates generally to fluid-filled chambers for use in the sole structure of an article of footwear.

BACKGROUND

Conventional articles of athletic footwear include two primary elements, an upper and a sole structure. The upper provides a covering for the foot that comfortably receives and securely positions the foot with respect to the sole structure. The sole structure may include fluid-filled chambers to provide cushioning and stability. The sole structure is secured to a lower portion of the upper and is generally positioned between the foot and the ground. In addition to attenuating ground reaction forces (that is, providing cushioning and stabilizing the foot during vertical and horizontal loading) during walking, running, and other ambulatory activities, the sole structure may influence foot motions (for example, by resisting pronation), impart stability, and provide traction. Accordingly, the upper and the sole structure operate cooperatively to provide a comfortable structure that is suited for a wide variety of athletic activities.

BRIEF SUMMARY

In one aspect, the present disclosure is directed to an article of footwear may have an upper and a sole structure secured to the upper. The sole structure may include a chamber for receiving a pressurized fluid, the chamber having a first chamber barrier layer and a second chamber barrier layer bonded to the first chamber barrier layer about peripheral portions of the first chamber barrier layer and the second chamber barrier layer to define an interior void between the first chamber barrier layer and the second chamber barrier layer. In addition, the chamber may include a tensile member extending between the first chamber barrier layer and the second chamber barrier layer, the tensile member including a first tensile member layer bonded to the first chamber barrier layer, a second tensile member layer bonded to the second chamber barrier layer, and a plurality of tethers connecting the first tensile member layer to the second tensile member layer. The second tensile member layer may include a first section and a second section separate from the first section. A portion of the second chamber barrier layer may extend toward the first tensile member layer between the first section and the second section of the second tensile member layer, the portion of the second chamber barrier layer that extends toward the first tensile member layer being joined to the first tensile member layer.

In another aspect, the present disclosure is directed to an article of footwear may have an upper and a sole structure secured to the upper. The sole structure may include a chamber for receiving a pressurized fluid, the chamber having a top barrier layer and a bottom barrier layer bonded to the top barrier layer about peripheral portions of the top barrier layer and the bottom barrier layer to define an interior void between the top barrier layer and the bottom barrier layer. The chamber may also include a tensile member extending between the top barrier layer and the bottom barrier layer, the tensile member including a first tensile member layer, the first tensile member layer having an upper surface and a lower surface, the upper surface of the first tensile member layer being bonded to a lower surface of the top barrier layer; a second tensile member layer having a lower surface bonded to the bottom barrier layer; and a plurality of tethers connecting the first tensile member layer to the second tensile member layer. The tensile member may include a first tensile member section and a second tensile member section, the first tensile member layer extending continuously between the first tensile member section and the second tensile member section. The second tensile member layer is discontinuous and includes a first tensile member layer section and a second tensile member layer section separated from the first tensile member layer section by a gap. In addition, a portion of the bottom barrier layer extends upward in the gap between the first tensile member layer section and the second tensile member layer section.

In another aspect, the present disclosure is directed to a die set for forming a chamber. The die set may include a first die having a substantially planar first die surface and a second die having a substantially planar second die surface. The first die and the second die may include peripheral portions configured to compress and bond chamber barrier layers to one another when the first die and the second die are pressed against one another. The second die may have an elongated projection extending from the substantially planar second die surface. Also, the elongated projection may be configured to bond portions of the chamber to one another when the first die and the second die are pressed against one another.

In another aspect, the present disclosure is directed to a method of making an article of footwear having an upper and a sole structure secured to the upper. The method may include forming a chamber for receiving a pressurized fluid by assembling a stacked arrangement of chamber components. The stacked arrangement of chamber components may include a first chamber barrier layer, a second chamber barrier layer, and a tensile member extending between the first chamber barrier layer and the second chamber barrier layer. The tensile member may include a first tensile member layer, a second tensile member layer, and a plurality of tethers connecting the first tensile member layer to the second tensile member layer. The second tensile member layer may include a first section and a second section separate from the first section. The method may also include bonding the first chamber barrier layer to the second chamber barrier layer to form peripheral portions of the chamber and to define an interior void between the first chamber barrier layer and the second chamber barrier layer. Further, the method may include extending a portion of the second chamber barrier layer toward the first tensile member layer between the first section of the second tensile member layer and the second section of the second tensile member layer, pressing the portion of the second chamber barrier layer against the first tensile member layer. Additionally, the method may include joining the portion of the second chamber barrier layer to the first tensile member layer between the first section of the second tensile member layer and the second section of the second tensile member layer, bonding the first tensile member layer to the first chamber barrier layer, and bonding the second tensile member layer to the second chamber barrier layer. Also, the method may include inflating the chamber with a pressurized fluid, incorporating the chamber into the sole structure, and attaching the sole structure to the upper.

In another aspect, the present disclosure is directed to a method of making a sole structure for an article of footwear, including forming a chamber for receiving a pressurized fluid. Forming the chamber may include assembling a stacked arrangement of chamber components. The stacked arrangement of chamber components may include a first chamber barrier layer, a second chamber barrier layer, and a tensile member extending between the first chamber barrier layer and the second chamber barrier layer. The tensile member may include a first tensile member layer, a second tensile member layer, and a plurality of tethers connecting the first tensile member layer to the second tensile member layer, wherein the second tensile member layer is discontinuous such that a first section of the second tensile member layer is separated from a second section of the second tensile member layer by a gap. The method may include bonding the first chamber barrier layer to the second chamber barrier layer to form peripheral portions of the chamber and to define an interior void between the first chamber barrier layer and the second chamber barrier layer. The method may also include extending a portion of the second chamber barrier layer toward the first tensile member layer in the gap between the first section of the second tensile member layer and the second section of the second tensile member layer, pressing the portion of the second chamber barrier layer against the first tensile member layer. In addition, the method may include joining the portion of the second chamber barrier layer to the first tensile member layer between the first section of the second tensile member layer and the second section of the second tensile member layer. The method may further include bonding the first tensile member layer to the first chamber barrier layer, bonding the second tensile member layer to the second chamber barrier layer, and inflating the chamber with a pressurized fluid.

In another aspect, the present disclosure is directed to a method of making a sole structure for an article of footwear, including forming a chamber for receiving a pressurized fluid. Forming the chamber may include assembling a stacked arrangement of chamber components. The stacked arrangement of chamber components may include a first chamber barrier layer, a second chamber barrier layer, and a tensile member extending between the first chamber barrier layer and the second chamber barrier layer, the tensile member including a first tensile member layer, a second tensile member layer, and a plurality of tethers connecting the first tensile member layer to the second tensile member layer, wherein the second tensile member layer is discontinuous such that a first section of the second tensile member layer is separated from a second section of the second tensile member layer by a gap. The method may include bonding the first chamber barrier layer to the second chamber barrier layer to form peripheral portions of the chamber and to define an interior void between the first chamber barrier layer and the second chamber barrier layer. Also, the method may include extending a portion of the second chamber barrier layer toward the first tensile member layer in the gap between the first section of the second tensile member layer and the second section of the second tensile member layer, pressing the portion of the second chamber barrier layer against the first tensile member layer. Further, the method may include joining the portion of the second chamber barrier layer to the first tensile member layer and inflating the chamber with a pressurized fluid.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION

Figure 1:
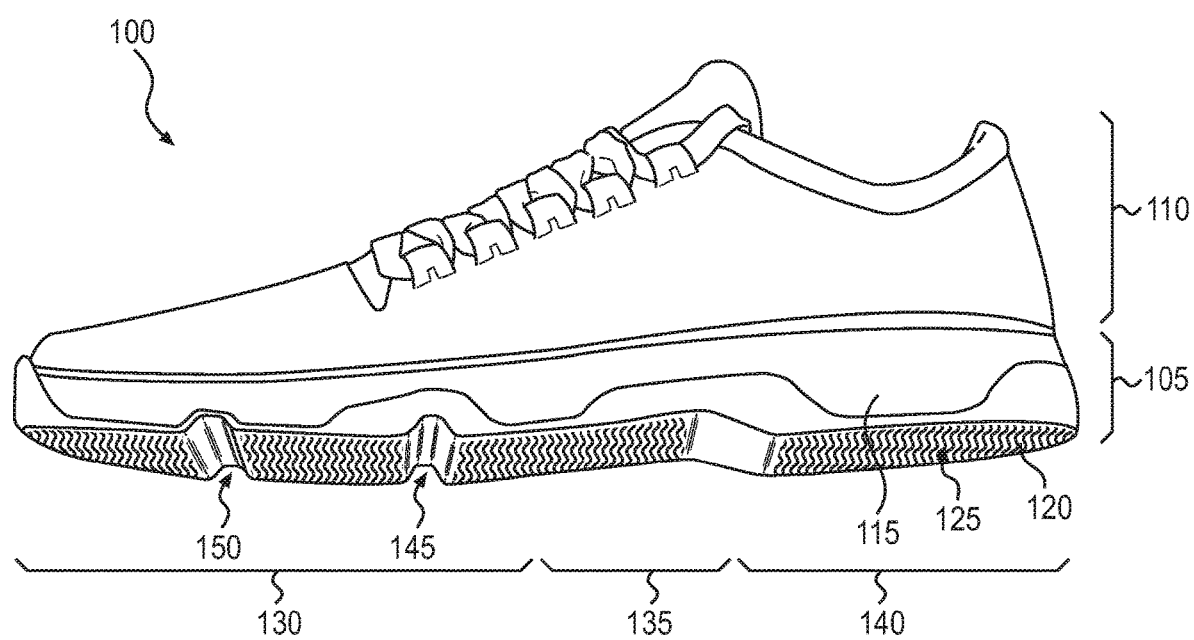
FIG. 1 shows an article of footwear according to an exemplary embodiment.

As previously discussed, articles of athletic footwear commonly include two primary elements, an upper and a sole structure. The upper is often formed from a plurality of material elements (for example, textiles, polymer sheets, foam layers, leather, synthetic leather, and other materials) that are stitched or adhesively bonded together to define a void on the interior of the footwear for comfortably and securely receiving a foot. More particularly, the upper forms a structure that extends over instep and toe areas of the foot, along medial and lateral sides of the foot, and around a heel area of the foot. The upper may also incorporate a lacing system to adjust fit of the footwear, as well as permit entry and removal of the foot from the void within the upper. In addition, the upper may include a tongue that extends under the lacing system to enhance adjustability and comfort of the footwear, and the upper may incorporate a heel counter.

The sole structure generally incorporates multiple layers, including, for example, a sockliner, a midsole, and a ground-engaging outer member. The sockliner is a thin, compressible member located within the upper and adjacent to a plantar (that is, lower) surface of the foot to enhance footwear comfort. The midsole is secured to a lower surface of the upper and forms a middle layer of the sole structure. Many midsole configurations are primarily formed from a resilient polymer foam material, such as polyurethane (PU) or ethyl vinyl acetate (EVA), that extends throughout the length and width of the footwear. The midsole may also incorporate plates, moderators, and/or other elements that further attenuate forces, influence the motions of the foot, and/or impart stability, for example. The ground-engaging outer member may be fashioned from a durable and wear-resistant material (for example, rubber) that includes texturing to improve traction.

Further, the sole structure may include fluid-filled chambers to provide cushioning and stability. Upon inflation, such chambers experience pressure that is evenly distributed to all portions of the inner surface of the bladder material from which the chamber is formed. Accordingly, the tendency is for chambers, when inflated, to take on an outwardly rounded shape. For use as cushioning members in footwear, however, it is desirable to provide the chambers with a relatively flat form, to serve as a platform for receiving the sole of a foot of a wearer. Thus, to limit the expansion of the top and bottom portions of the chamber upon inflation, sole structures have been developed with chambers having one or more tensile structures that link the top portion of the chamber to the bottom portion of the chamber in order to maintain the chambers in a substantially planar configuration. However, such tensile members may provide increased stiffness to the chambers. Accordingly, there is a need for chamber configurations that provide tensile member-equipped fluid-filled chambers with increased flexibility.

The present disclosure is generally directed to fluid-filled chamber configurations including tensile members including a top sheet, a bottom sheet, and a plurality of tethers extending between the top sheet and the bottom sheet. In order to provide flexibility to the chamber, the top or bottom tensile member sheet may be discontinuous and a portion of the barrier layer of the chamber may be fixedly attached to the tensile member sheet on the opposite side of the chamber. This configuration may form the chamber with a reduced thickness in the area of the discontinuity in the tensile member sheet. Due to the reduced thickness, the area of the chamber having the reduced thickness may be more flexible than other portions of the chamber. For example, the reduced thickness may form a flex groove. Such flex grooves may be selectively located at various portions of the chamber corresponding with portions of the article of footwear sole structure that are desired to have greater flexibility, such as the portion of the forefoot region corresponding with the ball of the foot.

The following discussion and accompanying figures disclose a sole structure for an article of footwear. Concepts associated with the footwear disclosed herein may be applied to a variety of athletic footwear types, including running shoes, basketball shoes, cross-training shoes, cricket shoes, golf shoes, soccer shoes, baseball shoes, cycling shoes, football shoes, golf shoes, tennis shoes, and walking shoes, for example. Accordingly, the concepts disclosed herein apply to a wide variety of footwear types.

For consistency and convenience, directional adjectives are employed throughout this detailed description corresponding to the illustrated embodiments. The term "longitudinal," as used throughout this detailed description and in the claims, refers to a direction extending a length of a sole structure, i.e., extending from a forefoot portion to a heel portion of the sole. The term "forward" is used to refer to the general direction in which the toes of a foot point, and the term "rearward" is used to refer to the opposite direction, i.e., the direction in which the heel of the foot is facing.

The term "lateral direction," as used throughout this detailed description and in the claims, refers to a side-to-side direction extending in the direction of the width of a sole. In other words, the lateral direction may extend between a medial side and a lateral side of an article of footwear, with the lateral side of the article of footwear being the surface that faces away from the other foot, and the medial side being the surface that faces toward the other foot.

The term "lateral axis," as used throughout this detailed description and in the claims, refers to an axis oriented in a lateral direction.

The term "horizontal," as used throughout this detailed description and in the claims, refers to any direction substantially parallel with the ground, including the longitudinal direction, the lateral direction, and all directions in between. Similarly, the term "side," as used in this specification and in the claims, refers to any portion of a component facing generally in a lateral, medial, forward, and/or rearward direction, as opposed to an upward or downward direction.

The term "vertical," as used throughout this detailed description and in the claims, refers to a direction generally perpendicular to both the lateral and longitudinal directions. For example, in cases where a sole is planted flat on a ground surface, the vertical direction may extend from the ground surface upward. It will be understood that each of these directional adjectives may be applied to individual components of a sole. The term "upward" refers to the vertical direction heading away from a ground surface, while the term "downward" refers to the vertical direction heading towards the ground surface. Similarly, the terms "top," "upper," and other similar terms refer to the portion of an object substantially furthest from the ground in a vertical direction, and the terms "bottom," "lower," and other similar terms refer to the portion of an object substantially closest to the ground in a vertical direction.

For purposes of this disclosure, the foregoing directional terms, when used in reference to an article of footwear, shall refer to the article of footwear in an upright position, with the sole facing groundward as it would be positioned when worn by a wearer standing on a substantially level surface.

In addition, for purposes of this disclosure, the term "fixedly attached" shall refer to two components joined in a manner such that the components may not be readily separated (for example, without destroying one or both of the components). Exemplary modalities of fixed attachment may include joining with permanent adhesive, rivets, stitches, nails, staples, welding or other thermal bonding, chemical or molecular bonding, and/or other joining techniques. In addition, two components may be "fixedly attached" by virtue of being integrally formed, for example, in a molding process.

As utilized herein, the term "welding" or variants thereof is defined as a securing technique between two elements that involves a softening or melting of a polymer material within at least one of the elements such that the materials of the elements are secured to each other when cooled. When exposed to sufficient heat, one or more of the polymer materials of chamber components transition from a solid state to either a softened state or a liquid state, particularly when a thermoplastic polymer material is utilized. When sufficiently cooled, the polymer materials then transition back from the softened state or the liquid state to the solid state. Based upon these properties of polymer materials, welding processes may be utilized to form a bond or weld between air chamber components. Thus, the term "weld" or variants thereof is defined as the bond, link, or structure that joins two elements through a process that involves a softening or melting of a polymer material within at least one of the elements such that the materials of the elements are secured to each other when cooled. As examples, welding may involve (a) the melting or softening of two elements that include polymer materials such that the polymer materials from each element intermingle with each other (e.g., diffuse across a boundary layer between the polymer materials) and are secured together when cooled and (b) the melting or softening of a polymer material in a first element such that the polymer material extends into or infiltrates the structure of a second element (e.g., infiltrates crevices or cavities formed in the second element or extends around or bonds with filaments or fibers in the second element) to secure the two elements together when cooled. Welding may occur when only one element includes a polymer material or when both elements include polymer materials. Additionally, welding does not generally involve the use of stitching or adhesives, but involves directly bonding elements to each other with heat. In some situations, however, adhesives may be utilized to supplement the weld or the joining of the elements through welding.

FIG. 1 depicts an embodiment of an article of footwear 100, which may include a sole structure 105 and an upper 110 secured to sole structure 105. As shown in FIG. 1 for reference purposes, footwear 100 may be divided into three general regions, including a forefoot region 130, a midfoot region 135, and a heel region 140. Forefoot region 130 generally includes portions of footwear 100 corresponding with the toes and the joints connecting the metatarsals with the phalanges. Midfoot region 135 generally includes portions of footwear 100 corresponding with an arch area of the foot. Heel region 140 generally corresponds with rear portions of the foot, including the calcaneus bone. Forefoot region 130, midfoot region 135, and heel region 140 are not intended to demarcate precise areas of footwear 100. Rather, forefoot region 130, midfoot region 135, and heel region 140 are intended to represent general relative areas of footwear 100 to aid in the following discussion.

Since sole structure 105 and upper 110 both span substantially the entire length of footwear 100, the terms forefoot region 130, midfoot region 135, and heel region 140 apply not only to footwear 100 in general, but also to sole structure 105 and upper 110, as well as the individual elements of sole structure 105 and upper 110. Footwear 100 may be formed of any suitable materials. In some configurations, the disclosed footwear 10 may employ one or more materials disclosed in Lyden et al., U.S. Pat. No. 5,709,954, issued Jan. 20, 1998, the entire disclosure of which is incorporated herein by reference.

Upper 110 may include one or more material elements (formed, for example, of textiles, foam, leather, and/or synthetic leather), which may be stitched, adhesively bonded, molded, or otherwise formed to define an interior void configured to receive a foot. The material elements may be selected and arranged to selectively impart properties such as durability, air-permeability, wear-resistance, flexibility, and comfort. Upper 110 may alternatively implement any of a variety of other configurations, materials, and/or closure mechanisms.

Sole structure 105 may have a configuration that extends between upper 110 and the ground and may be secured to upper 110 in any suitable manner. For example, sole structure 105 may be secured to upper 110 by adhesive attachment, stitching, welding, or any other suitable method. Sole structure 105 may include provisions for attenuating ground reaction forces (that is, cushioning and stabilizing the foot during vertical and horizontal loading). In addition, sole structure 105 may be configured to provide traction, impart stability, and/or limit various foot motions, such as pronation, supination, and/or other motions.

The configuration of sole structure 105 may vary significantly according to one or more types of ground surfaces on which sole structure 105 may be used. For example, the disclosed concepts may be applicable to footwear configured for use on indoor surfaces and/or outdoor surfaces. The configuration of sole structure 105 may vary based on the properties and conditions of the surfaces on which footwear 100 is anticipated to be used. For example, sole structure 105 may vary depending on whether the surface is harder or softer. In addition, sole structure 105 may be tailored for use in wet or dry conditions.

Sole structure 105 may include multiple components, which may individually and/or collectively provide footwear 100 with a number of attributes, such as support, rigidity, flexibility, stability, cushioning, comfort, reduced weight, traction, and/or other attributes. As shown in FIG. 1, sole structure 105 may include a ground-contacting outer member 120. In addition, in some embodiments, sole structure 105 may also include a midsole 115 disposed between outer member 120 and upper 110.

Outer member 120 may include an outer surface 125 exposed to the ground. Outer member 120 may include various features configured to provide traction. For example, in some embodiments, outer surface 125 may include a patterned tread, as shown in FIG. 1. In some embodiments, outer member 120 may include one or more ground-engaging cleat members extending from outer surface 125.

Outer member 120 may be formed of suitable materials for achieving the desired performance attributes. For example, outer member 120 may be formed of any suitable polymer, composite, and/or metal alloy materials. Exemplary such materials may include thermoplastic and thermoset polyurethane, polyester, nylon, polyether block amide, alloys of polyurethane and acrylonitrile butadiene styrene, carbon fiber, poly-paraphenylene terephthalamide (para-aramid fibers, e.g., Kevlar®), titanium alloys, and/or aluminum alloys. In some embodiments, outer member 120 may be fashioned from a durable and wear-resistant material (for example, rubber). Other suitable materials, including future-developed materials, will be recognized by those having skill in the art. Materials and configurations for outer member 120 may be selected according to the type of activity for which footwear 100 is configured.

Midsole 115 may have any suitable configuration and may provide cushioning and stability. For example, in some embodiments, midsole 115 may be formed of a compressible material, such as a resilient polymer foam material, examples of which may include polyurethane (PU) or ethyl vinyl acetate (EVA). In some embodiments, midsole 115 may extend throughout the length and width of footwear 100. In some embodiments, midsole 115 may also incorporate incompressible plates, moderators, and/or other elements that further attenuate forces, influence the motions of the foot, and/or impart stability, for example.

In some embodiments, the article of footwear may be provided with features that provide flexibility to the sole of the footwear. For example, in some embodiments, one or more components of the sole structure may have a flex groove that facilitates bending of the sole. In some embodiments, the sole structure may include a plurality of flex grooves in the forefoot region of the footwear. Also, the sole structure may include layered components, including, for example, an outer member (outsole), a midsole, and a cushioning element, such as a chamber filled with a pressurized fluid. In order to facilitate bending of the layered structure, the layered components may each have corresponding flex grooves.

Figure 2:
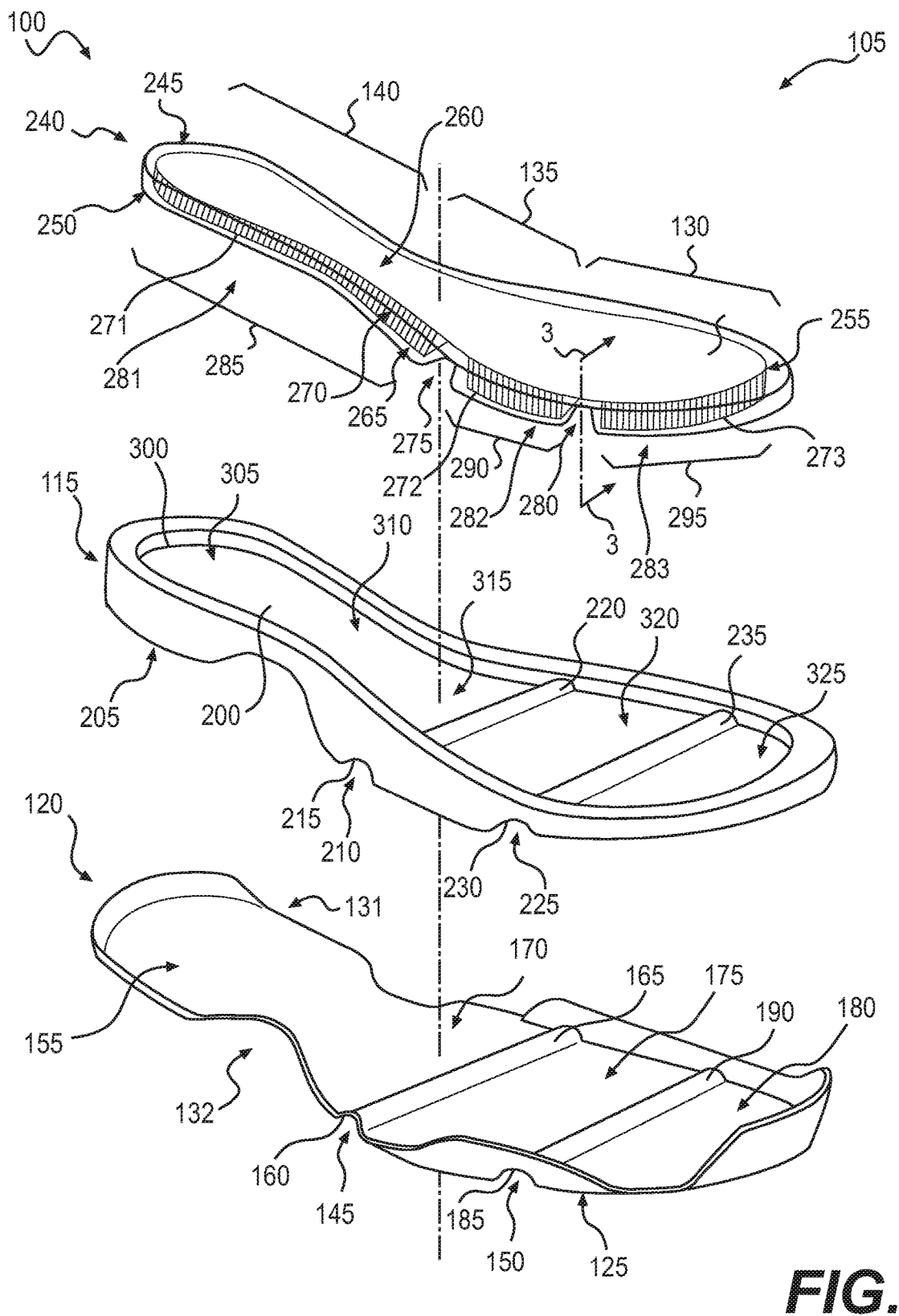
FIG. 2 shows an exploded view of an exemplary sole structure for an article of footwear.

FIG. 2 illustrates a portion of footwear 100, including sole structure 105. As shown in FIG. 2, outer member 120 may have an inner surface 155 opposite outer surface 125. Inner surface 155 may be disposed closer to a wearer's foot than outer surface 125 when footwear 100 is worn by the wearer. That is, inner surface 155 may be disposed upward of outer surface 125. Outer member 120 may include a first flex groove portion 145 and a second flex groove portion 150. First flex groove portion 145 may include a first elongate recess 160 in outer surface 125 of outer member 120. Elongate recess 160 may be formed by an upward curvature in outer surface 125 of outer member 120, which extends in an upward direction (that is, toward the wearer's foot when footwear 100 is worn by the wearer).

In some embodiments, outer member 120 may have a substantially consistent thickness. Due to the consistent thickness of outer member 120, inner surface 155 of outer member 120 may also include an upward curvature, extending in an upward direction (that is, toward the wearer's foot when footwear 100 is worn by the wearer), thus forming an elongate rib 165 in first flex groove portion 145. Accordingly, both outer surface 125 and inner surface 155 of outer member 120 may curve towards the wearer's foot when footwear 100 is worn by a wearer.

First flex groove portion 145 may separate a first outer member forefoot region 170 from a second outer member forefoot region 175. In some embodiments, first flex groove 145 may form a thinner portion of outer member 120 (in a vertical direction) than other portions of outer member 120 (such as first outer member forefoot region 170 and second outer member forefoot region 175), in order to provide increased flexibility of outer member 120 in this area.

In some embodiments, first flex groove portion 145 may extend in a lateral direction. For example, footwear 100, and therefore outer member 120, may have a medial side 131 and a lateral side 132. As shown in FIG. 2, elongate recess 160 and elongate rib 165 of first flex groove portion 145 may extend substantially from a medial edge 133 of outer member 120 to a lateral edge 134 of outer member 120. Further, in some embodiments, first flex groove portion 145 may extend completely from medial edge 133 to lateral edge 134, as shown in FIG. 2.

In some embodiments, outer member 110 may also include one or more additional flex groove portions, such as second flex groove portion 150, as shown in FIG. 2. Second flex groove portion 150 may separate second forefoot region 175 from a third forefoot region 180. Second flex groove portion 150 may form a thinner portion of outer member 110 than other portions of outer member 110, in order to provide increased flexibility of outer member 110. Second flex groove portion 150 may include a second elongate recess 185 in outer surface 125 of outer member 120. As with first elongate recess 160, elongate recess 185 may extend in an upward direction (that is, toward the wearer's foot when footwear 100 is worn by the wearer). Also similar to first flex groove portion 145, second flex groove portion 150 may also include a second elongate rib 190 formed by the upward curvature of inner surface 155 of outer member 120.

As shown in FIG. 2, midsole 115 may have a first midsole surface 200 and a second midsole surface 205 opposite first midsole surface 200. In some embodiments, midsole 115 may include a third flex groove portion 210. Third flex groove portion 210 may include a third elongate recess 215 in second midsole surface 205. Third elongate recess 215 may extend in an upward direction (that is, toward a wearer's foot when footwear 100 is worn by the wearer). Third flex groove portion 210 may also include a third elongate rib 215 in first midsole surface 200. Third elongate rib 215 may extend in an upward direction (that is, toward the wearer's foot when footwear 100 is worn by the wearer).

As further shown in FIG. 2, midsole 115 may also include a fourth flex groove portion 225. Fourth flex groove portion 225 may include a fourth elongate recess 230 in second midsole surface 205. Fourth elongate recess 230 may extend in an upward direction (that is, toward a wearer's foot when footwear 100 is worn by the wearer). Fourth flex groove portion 225 may also include a fourth elongate rib 235 in first midsole surface 200. Fourth elongate rib 235 may extend in an upward direction (that is, toward the wearer's foot when footwear 100 is worn by the wearer).

As shown in FIG. 2, in some embodiments, third elongate recess 215 in second midsole surface 205 may receive first elongate rib 165 of first flex groove portion 145 of outer member 120. Similarly, in some embodiments, fourth elongate recess 230 in second midsole surface 205 may receive second elongate rib 190 of second flex groove portion 150 of outer member 120. Thus, first elongate rib 165 and second elongate rib 190 may be disposed in a nested relationship with third elongate recess 215 and fourth elongate recess 230, respectively.

In some embodiments, the sole structure may include one or more additional components that provide cushioning. For example, in some embodiments, the sole structure may include a chamber filled with pressurized gases. In some configurations, the chamber may include elongate indentations configured to receive elongate ribs in the midsole or outsole member and to provide the chamber with flexibility.

As shown in FIG. 2, in some embodiments, sole structure 105 may include a chamber 240 for receiving a pressurized fluid. In some embodiments, chamber 240 may include a first chamber barrier layer 245 and a second chamber barrier layer 250. As shown in FIG. 2, in some embodiments, first chamber barrier layer 245 may be a top barrier layer and second chamber barrier layer 250 may be a bottom barrier layer. Second chamber barrier layer 245 may be bonded to first chamber barrier layer 240 about peripheral portions of first chamber barrier layer 240 and second chamber barrier layer 245 to define an interior void between first chamber barrier layer 240 and second chamber barrier layer 245.

Chamber 240 may be formed from a polymer or other bladder material that provides a sealed barrier for enclosing a fluid. As noted above, the bladder material may be transparent. A wide range of polymer materials may be utilized for chamber 240. In selecting materials for chamber 240, engineering properties of the material (e.g., tensile strength, stretch properties, fatigue characteristics, dynamic modulus, and loss tangent) as well as the ability of the material to prevent the diffusion of the fluid contained by chamber 240 may be considered. When formed of thermoplastic urethane, for example, the outer barrier of chamber 240 may have a thickness of approximately 1.0 millimeter, but the thickness may range from 0.25 to 2.0 millimeters or more, for example.

In addition to thermoplastic urethane, examples of polymer materials that may be suitable for chamber 240 include polyurethane, polyester, polyester polyurethane, and polyether polyurethane. Chamber 240 may also be formed from a material that includes alternating layers of thermoplastic polyurethane and ethylene-vinyl alcohol copolymer, as disclosed in U.S. Pat. Nos. 5,713,141 and 5,952,065 to Mitchell, et al. A variation upon this material may also be utilized, wherein a center layer is formed of ethylene-vinyl alcohol copolymer, layers adjacent to the center layer are formed of thermoplastic polyurethane, and outer layers are formed of a regrind material of thermoplastic polyurethane and ethylene-vinyl alcohol copolymer. Another suitable material for chamber 240 is a flexible microlayer membrane that includes alternating layers of a gas barrier material and an elastomeric material, as disclosed in U.S. Pat. Nos. 6,082,025 and 6,127,026 to Bonk, et al. Additional suitable materials are disclosed in U.S. Pat. Nos. 4,183,156 and 4,219,945 to Rudy. Further suitable materials include thermoplastic films containing a crystalline material, as disclosed in U.S. Pat. Nos. 4,936,029 and 5,042,176 to Rudy, and polyurethane including a polyester polyol, as disclosed in U.S. Pat. Nos. 6,013,340; 6,203,868; and 6,321,465 to Bonk, et al. The patents listed in this paragraph are incorporated herein by reference in their entirety.

The fluid within chamber 240 may range in pressure from zero to three-hundred-fifty kilopascals (i.e., approximately fifty-one pounds per square inch) or more. In some configurations of sole structure 105, a suitable pressure for the fluid may be a substantially ambient pressure. That is, the pressure of the fluid may be within five kilopascals of the ambient pressure of the atmospheric air surrounding footwear 100. The pressure of fluid within chamber 240 may be selected to provide desirable performance attributes. For example, higher pressures may provide a more responsive cushioning element, whereas lower pressures may provide more ground force attenuation (a softer cushion). The pressure of fluid within chamber 240 may be selected to work in concert with other cushioning elements of footwear 100, such as foam members and/or an insole (not shown). In some embodiments the insole may be formed of a compressible material.

In some configurations, chamber 240 may be inflated with substantially pure nitrogen. Such an inflation gas promotes maintenance of the pressure within chamber 240 through diffusion pumping, whereby the deficiency of other gases (besides nitrogen), such as oxygen, within chamber 240 biases the system for inward diffusion of such gasses into chamber 240. Further, bladder materials, such as those discussed above, may be substantially impermeable to nitrogen, thus preventing the escape of the nitrogen from chamber 240.

In some configurations, relatively small amounts of other gases, such as oxygen or a mixture of gasses, such as air, may be added to the nitrogen occupying most of the volume within chamber 240. In addition to air and nitrogen, the fluid contained by chamber 240 may include octafluoropropane or be any of the gasses disclosed in U.S. Pat. No. 4,340,626 to Rudy, such as hexafluoroethane and sulfur hexafluoride, for example. In some configurations, chamber 240 may incorporate a valve that permits the individual to adjust the pressure of the fluid. In other configurations, chamber 240 may be incorporated into a fluid system, as disclosed in U.S. Pat. No. 7,210,249 to Passke, et al., as a pump chamber or a pressure chamber. In order to pressurize chamber 240 or portions of chamber 240, the general inflation methods disclosed in Hensley et al., U.S. Pat. No. 8,241,450, issued Aug. 14, 2012, and entitled "Method For Inflating A Fluid-Filled Chamber," and Schindler et al., U.S. Patent Application Publication No. US 2009/0151196, published Jun. 18, 2009, entitled "Article Of Footwear Having A Sole Structure With A Fluid-Filled Chamber" may be utilized. The patents and published patent applications listed in this paragraph are incorporated herein by reference in their entirety.

In some embodiments, the chamber may include one or more features that limit the expansion of the top and bottom portions of the chamber upon inflation. For example, in some embodiments, the chamber may include one or more tensile structures that link the top portion of the chamber to the bottom portion of the chamber. Such tensile structures may be substantially inelastic (or may have a limited elasticity) such that, when the chamber is inflated causing the top and bottom portions of the chamber to be biased apart from one another, the tensile structures limit the distance by which the top and bottom portions may be separated during inflation. Accordingly, the tensile members may enable the bladder to retain its intended, substantially planar shape.

As shown in FIG. 2, a tensile member 255 may extend between first chamber barrier layer 245 and second chamber barrier layer 250. Tensile member 255 may include a first tensile member layer 260 bonded to first chamber barrier layer 245. In addition, tensile member 255 may also include a second tensile member layer 265 bonded to second chamber barrier layer 260. Also, tensile member 255 may include a plurality of tethers 270 connecting first tensile member layer 260 to second tensile member layer 265. The outward force of pressurized fluid within chamber 240 places tethers 270 in tension and restrains further outward movement of first tensile member layer 260 and first chamber barrier layer 245 away from second tensile member layer 265 and second chamber barrier layer 250.

Tensile member 255 may have any configuration suitable for limiting the distance between first chamber barrier layer 245 and second chamber barrier layer 250 of chamber 240 when inflated. For example, tensile member 255 may have any of the configurations disclosed in Dua, U.S. Pat. No. 8,151,486, issued Apr. 10, 2012, and entitled "Fluid-Filled Chamber with a Textile Tensile Member;" Peyton et al., U.S. Patent Application Publication No. 2011/0131831, published Jun. 9, 2011, and entitled "Tethered Fluid-Filled Chambers,"; and Hazenberg et al., U.S. Patent Application Publication No. 2013/0266773, published Oct. 10, 2013, and entitled "Spacer Textile Materials and Methods for Manufacturing the Spacer Textile Materials," the entire disclosures of which are incorporated herein by reference.

In some configurations, tethers 270 may include a plurality of substantially planar slats. In some configurations, such slats may be arranged in a substantially vertical orientation. In other embodiments, such slats may be angled with respect to first chamber barrier layer 245 and second chamber barrier layer 250. Further, such slats may be oriented in any suitable direction. For example, in some embodiments, the slats may be oriented in a substantially lateral direction. In other embodiments, the slats may be oriented in a substantially longitudinal direction. Other orientations are also possible. Tethers 270 may have any of the planar configurations disclosed in Dua, U.S. Pat. No. 8,151,486, issued Apr. 10, 2012, and entitled "Fluid-Filled Chamber with a Textile Tensile Member."

In some configurations, tethers 270 may include a plurality of strand-like members having a substantially one-dimensional configuration. For example, tethers 270 may each have a length between first tensile member layer 260 and second tensile member 265. This length may be substantially greater than the width or thickness of the one-dimensional tethers. Tethers 270 may have any of the one-dimensional configurations disclosed in Peyton et al., U.S. Patent Application Publication No. 2011/0131831, published Jun. 9, 2011, and entitled "Tethered Fluid-Filled Chambers."

Tethers 270 may be formed of any suitable material. For example in some embodiments, tethers 270 may be formed of a polymer material. In some embodiments, tensile member 255 may be formed of a three-dimensional fabric (3-D fabric). Tensile member 255 may be formed as a unitary (i.e., one-piece) textile element having the configuration of a spacer-knit textile. A variety of knitting techniques may be utilized to form tensile member 255 and impart a specific configuration (e.g., taper, contour, length, width, thickness) to tensile member 255. In general, knitting involves forming courses and wales of intermeshed loops of a yarn or multiple yarns. In production, knitting machines may be programmed to mechanically-manipulate yarns into the configuration of tensile member 255. That is, tensile member 255 may be formed by mechanically-manipulating yarns to form a one-piece textile element that has a particular configuration. The two major categories of knitting techniques are weft-knitting and warp-knitting. Whereas a weft-knit fabric utilizes a single yarn within each course, a warp-knit fabric utilizes a different yarn for every stitch in a course. In some embodiments, tensile member 255 may be formed using double needle bar Raschel knitting. In some embodiments, tensile member 255 may be formed using configurations disclosed in Hazenberg et al., U.S. Patent Application Publication No. 2013/0266773, published Oct. 10, 2013, and entitled "Spacer Textile Materials and Methods for Manufacturing the Spacer Textile Materials."

In some embodiments, all of tethers 270 may have substantially the same length, thus providing tensile member 255 with a substantially constant thickness. In other embodiments, tethers 270 may have different lengths. In some embodiments, first tensile member layer 260 and second tensile member layer 260 may each have a generally continuous and planar configuration. In some embodiments, first tensile member layer 260 and second tensile member layer 265 may be substantially parallel to one another. In other embodiments, tensile member 255 may have a tapered configuration. For example, in some embodiments, tensile member 255 may have a tapered configuration between heel region 140 and forefoot region 130. In order to impart the tapered configuration, the lengths of tethers 270 may decrease between heel region 140 and forefoot region 130. Exemplary tapered chamber configurations are disclosed in Dua, U.S. Pat. No. 8,151,486, issued Apr. 10, 2012, and entitled "Fluid-Filled Chamber with a Textile Tensile Member."

In some embodiments, one or both of first tensile member layer 260 and second tensile member layer 260 may have a contoured configuration. For example, in some embodiments, first tensile member layer 260 may have a concave configuration to conform to the anatomical shapes of the foot. A depression in heel region 140 may cradle the heel of a wearer and more evenly distribute contact forces between chamber 240 and the foot of the wearer. Exemplary contoured chamber configurations are disclosed in Dua, U.S. Pat. No. 8,151,486, issued Apr. 10, 2012, and entitled "Fluid-Filled Chamber with a Textile Tensile Member;" and Peyton et al., U.S. Patent Application Publication No. 2011/0131831, published Jun. 9, 2011, and entitled "Tethered Fluid-Filled Chambers."

In some embodiments, tensile member 255 may include multiple sections. For example, as shown in FIG. 2, tensile member 255 may include a first tensile member section 281 corresponding with a first chamber portion 285. Tensile member 255 may also include a second tensile member section 282 corresponding with a second chamber portion 290. Further, tensile member 255 may include a third tensile member section 283 corresponding with a third chamber portion 295.

In some embodiments, midsole 115 may include a recess 300 configured to receive chamber 240. First chamber portion 281 may be received by a first portion of recess 300 including a heel recess region 305, a midfoot recess region 310, and a first forefoot recess region 315. This first portion of recess 300 may be separated from a second forefoot recess region 320 by third elongate rib 220. Second forefoot recess region 320 may receive second chamber portion 290. Further, second forefoot recess region 320 may be separated from a third forefoot recess region 325 by fourth elongate rib 235. Third forefoot recess region 325 may receive third chamber portion 295.

As shown in FIG. 2, spaces between the chamber portions may form indentations. For example, the space between first chamber portion 285 and second chamber portion 290 may form a first elongate indentation 275, as shown in FIG. 2. Similarly, the space between second chamber portion 290 and third chamber portion 295 may form a second elongate indentation 280. In some embodiments, first elongate indentation 275 may receive third elongate rib 220 of third flex groove portion 210 of midsole 115, in a nesting relationship. Second elongate indentation 275 may receive fourth elongate rib 235 of midsole 115, also in a nesting relationship.

The nested relationships between the ribs of outer member 120 and the recesses of midsole 115, as well as the nesting relationships between the ribs of midsole 115 and the indentations of chamber 240, may enable sole structure 105 to have a thinner profile. That is, the overall thickness of sole structure 105 as formed by the combination of sole structure components (outer member 120, midsole 115, and chamber 240) may be reduced. For example, a wearer's foot may be located lower to the ground than if the entirety of midsole 115 were located at the raised height of first elongate rib 165 and second elongate rib 190. Similarly, a wearer's foot may be located lower to the ground than if the entirety of chamber 240 were located at the raised height of third elongate rib 220 and fourth elongate rib 235.

The reduced overall thickness of sole structure 105 provided by the nesting relationships of sole structure components may increase the stability and responsiveness of sole structure 105. Alternatively, or additionally, the reduced overall thickness, which is made possible by the nesting relationships of sole structure components, may provide more space for sole structure components. For example, because most of midsole 115 may be positioned lower to the ground, thicker cushioning elements, such as chamber 240, may be utilized in conjunction with midsole 115 without unduly raising the footbed of footwear 110.

As shown in FIG. 2, first tensile member layer 260 may extend continuously between first tensile member section 281, second tensile member section 282, and third tensile member section 282. Second tensile member layer 265 may be discontinuous. For example, second tensile member layer 265 may include a first tensile member layer section 271, a second tensile member layer section 272, and a third tensile member layer 273. First tensile member layer section 271 may be separated from second tensile member layer section 272 by a gap corresponding with first indentation 275. Second tensile member layer section 272 may be separated from third tensile member layer section 273 by a gap corresponding with second indentation 280.

It will be noted that, although first elongate indentation 275 and second elongate indentation are shown in FIG. 2 as being substantially laterally oriented, in some embodiments, the configuration of elongate indentations in chamber 240 may have any suitable orientation. In addition, the number of elongate indentations may vary. Additional elongate indentations may provide chamber 240 with additional flexibility.

Figure 3:
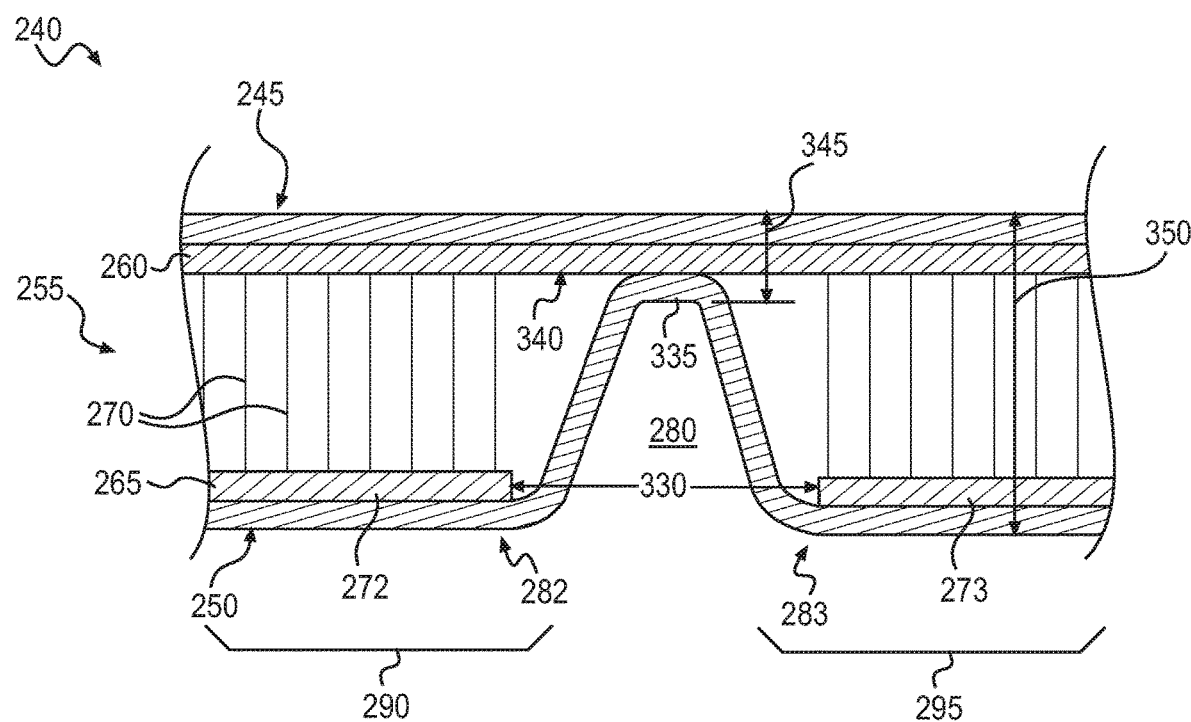
FIG. 3 shows a cross-sectional view of a portion of the sole structure taken at section line 3-3 in FIG. 2.

FIG. 3 is a cross-sectional view taken at section line 3-3 of FIG. 2. In particular, FIG. 3 illustrates a cross-sectional view of chamber 240 through second indentation 280. As shown in FIG. 3, first chamber barrier layer 245 extends across second chamber portion 290 and third chamber portion 295. As discussed above, first tensile member layer 260 may extend continuously between second tensile member section 282 and third tensile member section 283. Further, as also discussed above, second tensile member layer 265 may include second tensile member layer section 272 and a third tensile member layer section 273, which may be separated by a gap 330.

In order to provide second tensile member layer 265 with separate sections, a portion of first tensile member layer 260 may be omitted to form gap 330. In some embodiments, the portions of material may be omitted during manufacturing of tensile member 255. In some embodiments, the portions of material may be removed from tensile member 255. For example, in some embodiments, the material may be removed by cutting tools, such as lasers, blades, cutting wheels, shears, or other suitable cutting implements.

As shown in FIG. 3, a portion 335 of second chamber barrier layer 250 extends upward in gap 330 toward first tensile member layer 260 between second tensile member layer section 272 and third tensile member layer section 273 of second tensile member layer 265. Portion 335 of second chamber barrier layer 250 that extends toward first tensile member layer 260 may be joined to first tensile member layer 260. That is, portion 335 of the bottom barrier layer extends upward between the second tensile member layer section 272 and third tensile member layer section 273 of second tensile member layer 265 and joins to a lower surface 340 of first tensile member layer 260.

In order to facilitate this joinder of first tensile member layer 260 with second chamber barrier layer 250, first tensile member layer 260 may be formed of a material that is suited for bonding with second chamber barrier layer 250. In some embodiments, first tensile member layer 260 may be formed of a material that is configured to provide added strength in order to compensate for at least some of the effect of having a portion of second tensile member layer 265 omitted. Such added strength may be provided by selecting a stronger material and/or by increasing the amount of material used (e.g., the thickness) for first tensile member layer 260. In some embodiments, first tensile member layer 260 may be constructed in a manner that provides increased strength. For example, in some embodiments where first tensile member layer 260 is a textile, different knitting/weaving processes may be used to provide added strength.

By joining portion 335 of second chamber barrier layer 250 to first tensile member layer 260, several advantages may be provided. For example, this configuration provides chamber 240 with flexibility. This flexibility is provided by several aspects of this configuration. By joining portion 335 of second chamber barrier layer 250 to first tensile member layer 260, the thickness of chamber 240 may be reduced in that area. As shown in FIG. 3, chamber 240 may have a first thickness 345 at the junction between portion 335 of second chamber barrier layer 250 and first tensile member layer 260. Chamber 240 may have a second thickness 350 over a majority of chamber 240. As shown in FIG. 3, first thickness 345 of chamber 240 may be less than second thickness of chamber 240. This reduced thickness may act as a living hinge, thus enabling flexion between second chamber portion 290 and third chamber portion 295.

Joining portion 335 of second chamber barrier layer 250 to first tensile member layer 260 also defines second indentation 280, which may receive flex groove portions of mating sole structure components. This enables the sole structure components to have a nesting relationship that provides the sole structure with a thinner profile. As discussed above, this thinner profile may provide the footwear with stability and responsiveness.

In addition, although second tensile member layer 265 is separated into multiple sections, such as second tensile member layer section 272 and third tensile member layer section 273, first tensile member layer 260 remains continuous across multiple sections of chamber 240. Thus, tensile member 255 may be a fully pre-formed structure prior to assembly into chamber 240. Tensile member 255 being a fully pre-formed structure may facilitate positioning of tensile member 255 during assembly, because there are no separate pieces that may become out of place with respect to one another when pressed between first chamber barrier layer 245 and second chamber barrier layer 250.

In some embodiments, the sole structure may omit the midsole layer between the chamber and outsole. That is, the chamber may be secured directly to the outer member of the sole structure. In such embodiments, the indentations of the chamber may receive the elongate ribs of the flex groove portions of the outer member of the sole structure. In some cases, such a configuration may provide the sole structure with an even lower profile. In some embodiments, a midsole may be located above the chamber. That is, in some cases, the chamber may be disposed between the midsole and the outsole.

Figure 4:
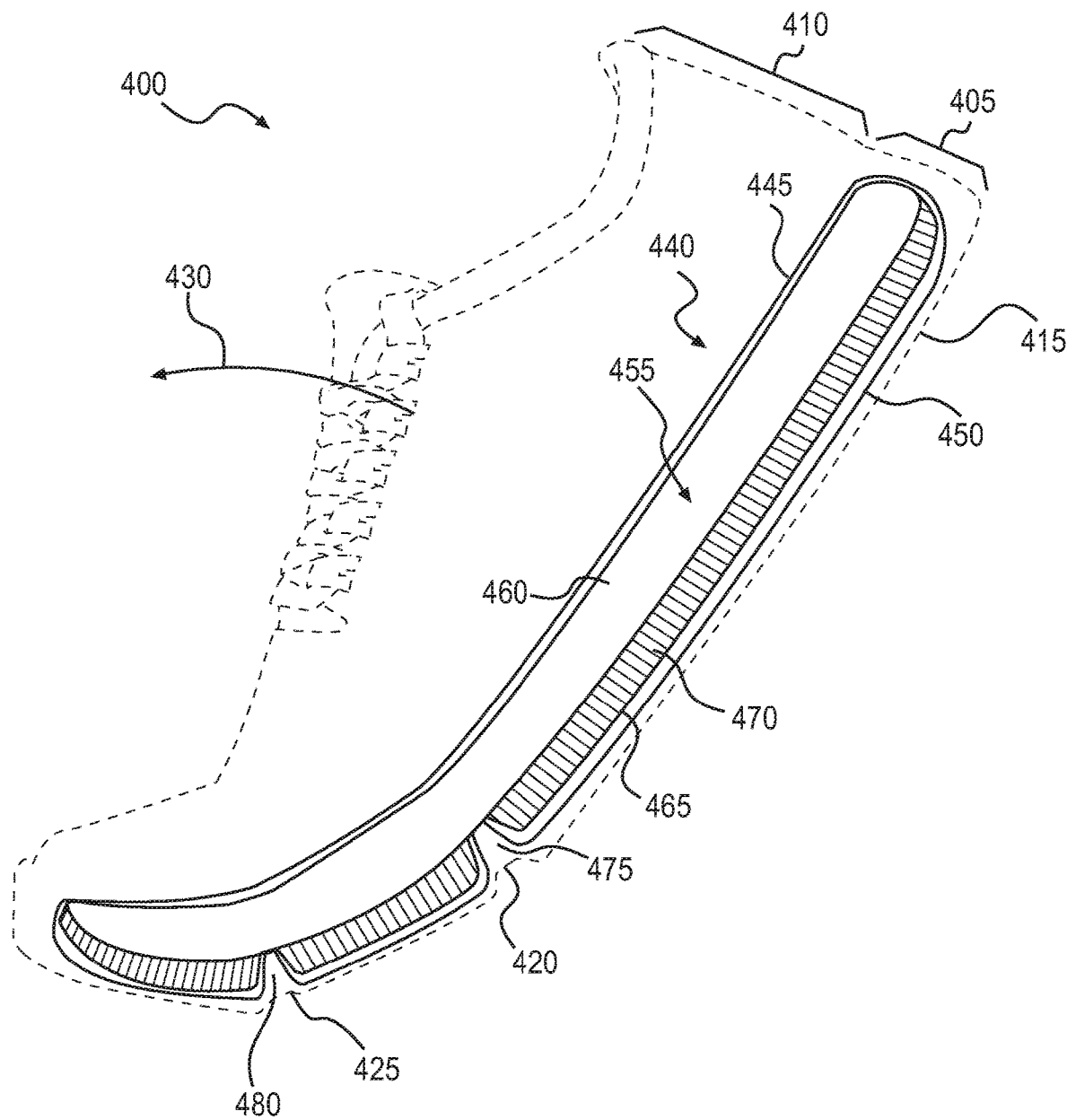
FIG. 4 shows an exemplary article of footwear having a sole structure including a fluid-filled chamber.

FIG. 4 shows an article of footwear 400. Footwear 400 may include a sole structure 405 secured to an upper 410. Sole structure 405 may include an outer member 415 and a chamber 440. FIG. 4 shows footwear 400 in an articulated position with the heel portion raised in the direction of an arrow 430. This articulation is indicated by flexion of a first flex groove portion 420 and a second flex groove portion 425 of outer member 415. In addition, this articulation also involves the flexion of a first indentation 475 and a second indentation 480 in chamber 440.

Like chamber 240 discussed above, chamber 440 may include a first chamber barrier layer 445 and a second chamber barrier layer 450. In addition, chamber 440 may also include a tensile member 455 bonded to first chamber barrier layer 445 and second chamber barrier layer 450, and configured to limit the spacing between these barrier layers when chamber 440 is pressurized. Tensile member 455 may include a first tensile member layer 460 and a second tensile member layer 465. Tensile member 455 may also include a plurality of tethers 470 connecting first tensile member layer 460 to second tensile member layer 465. Characteristics of the components of footwear 400 and chamber 440 discussed above may be substantially similar to corresponding components discussed above regarding other embodiments.

As shown in FIG. 4, wherein the portion of second chamber barrier layer 450 that extends toward first tensile member layer 460 defines first elongate indentation 475 in chamber 440. As shown in FIG. 4, first elongate indentation 475 may receive a first elongate rib formed by first flex groove portion 420 of outer member 415. Similarly, second elongate indentation 480 may receive a second elongate rib formed by second flex groove portion 425.

In some embodiments, chambers having multiple sections may be incorporated into sole structures that may or may not include a midsole. Accordingly, in some embodiments, the sole structure may include a midsole that includes elongate ribs that may nest within elongate indentations in the chamber. In other embodiments, the sole structure may include an outer member that includes elongate ribs that may nest within elongate indentations in the chamber. Thus, the sole structure may include an additional sole structure component, the additional sole structure component including at least one of a midsole and an outer member exposed to the ground. The additional sole structure component may have an upper surface and a lower surface. Further, the additional sole structure component may have a flex groove portion including an elongate recess in the bottom surface and a corresponding elongate rib on the upper surface. The portion of the bottom barrier layer that extends upward between a first section and a second section of a second tensile member layer may define an elongate indentation in the chamber that receives the elongate rib of the flex groove portion of the additional sole structure component.

Figure 5:
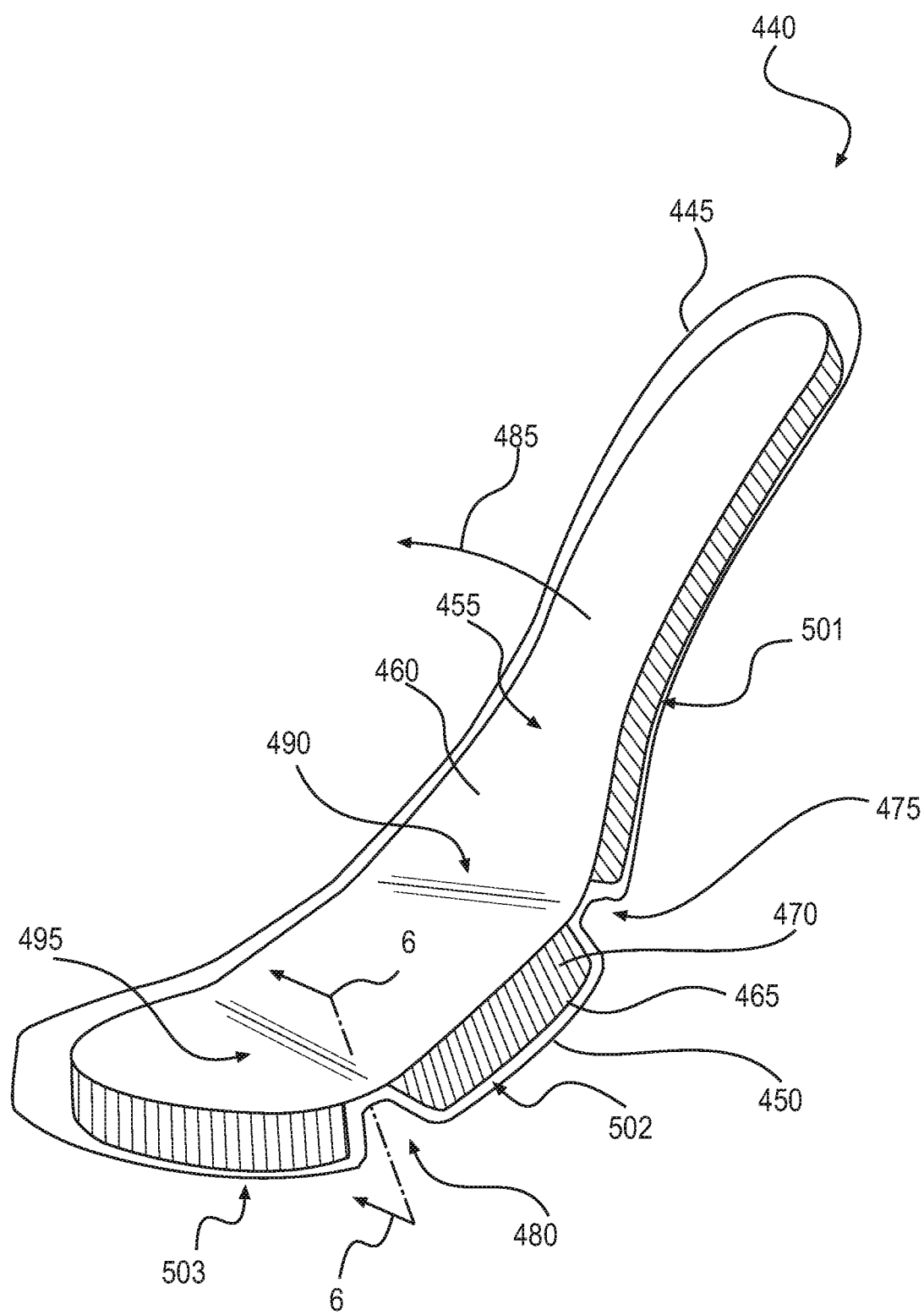
FIG. 5 shows a perspective view of the chamber shown in FIG. 4.

FIG. 5 illustrates an isolated view of chamber 440 shown in an articulated configuration. As shown in FIG. 5, second tensile member layer 465 may be formed as multiple separate sections, such as a first tensile member layer section 501, a second tensile member layer section 502, and a third tensile member layer section 503. First elongate indentation 475 of chamber 440 may be located between first tensile member layer section 501 from second tensile member layer section 502. Similarly, second elongate indentation 480 may be located between second tensile member layer section 502 and third tensile member layer section 503. As shown in FIG. 5, flexion of chamber 440 in the direction of arrow 485 may result in the articulation of chamber 440 at a first flex line 490 corresponding with first elongate indentation 475 and a second flex line 495 corresponding with second elongate indentation 480.

Figure 6:
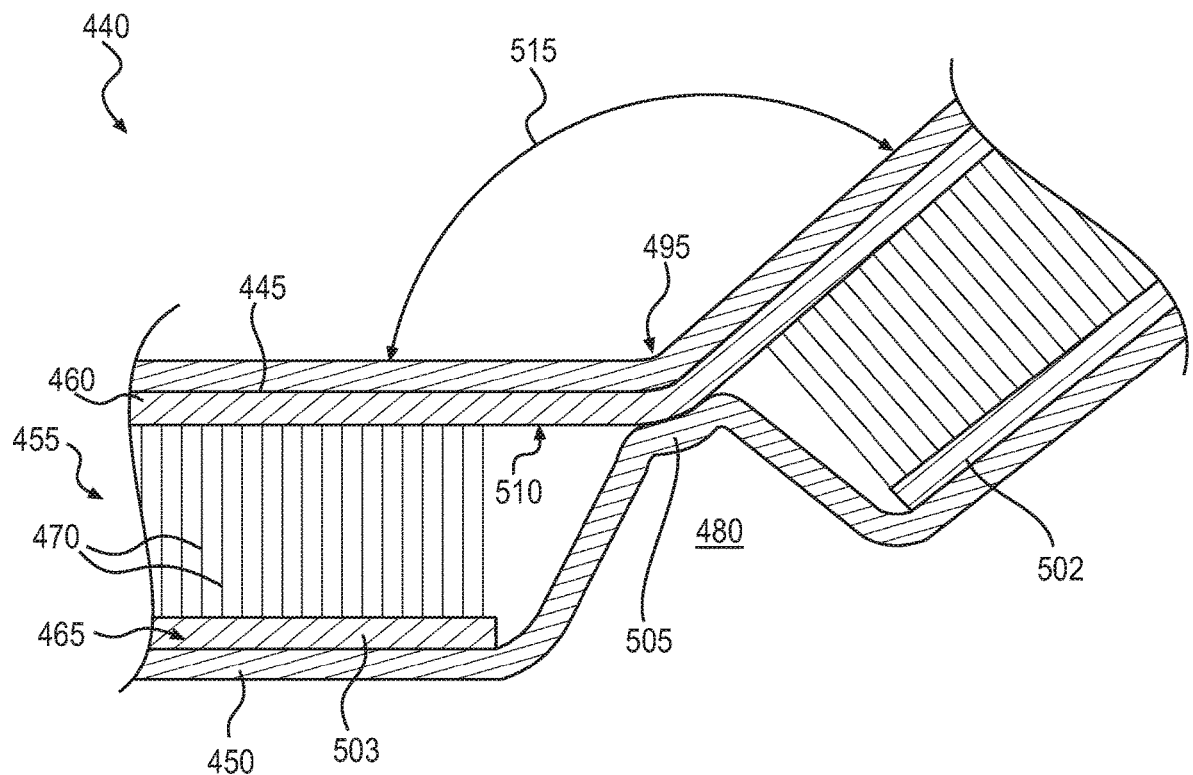
FIG. 6 shows a cross-sectional view of a portion of the chamber taken at section line 6-6 in FIG. 5.

FIG. 6 is a cross-sectional view of chamber 440 taken at section line 6-6 in FIG. 5. As shown in FIG. 6, a portion 505 of second chamber barrier layer 450 may extend upward between second tensile member layer section 502 and third tensile member layer section 503. As further shown in FIG. 6, section 505 of second chamber barrier layer 450 may be joined to a lower surface 510 of first tensile member layer 460. FIG. 6 further illustrates the articulation of chamber 440 by flexion at second flex line 495. As shown in FIG. 6, chamber 440 may be flexed at an angle illustrated by angle 515. Angle 515 is an exemplary angle and is not intended to indicate the limit to which chamber 440 may be flexed.

Figure 7:
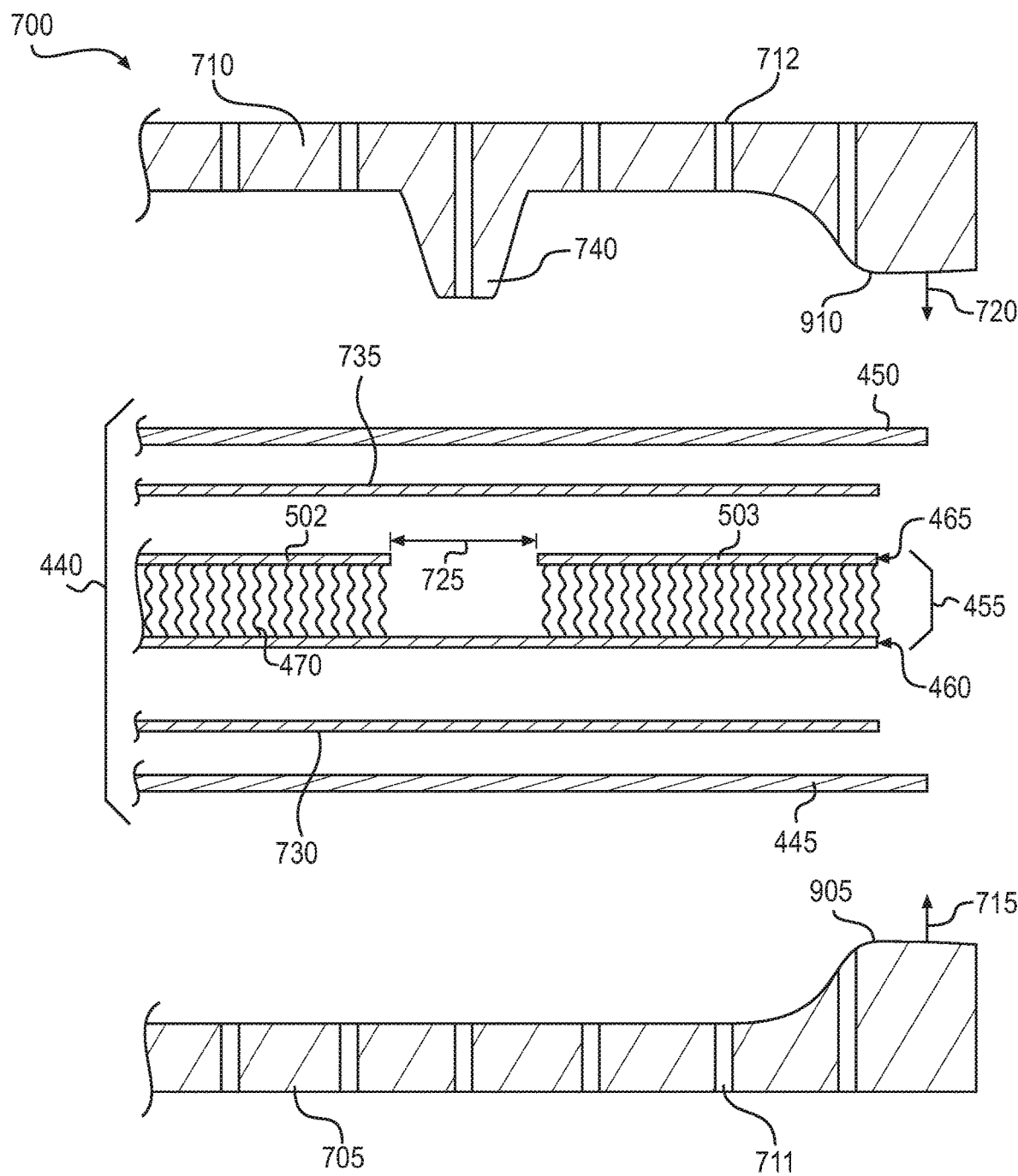
FIG. 7 shows an exploded view of chamber components, and a die set for joining portions of the chamber components to one another.

FIG. 7 shows an exploded view of chamber components, and a die set for joining portions of the chamber components to one another. In particular, FIG. 7 illustrates an exploded view of chamber 440. As shown in FIG. 7 chamber 440 may include a first adhesive layer 730 between first chamber barrier layer 445 and first tensile member layer 460 and a second adhesive layer 735 between second chamber barrier layer 450 and second tensile member layer 465. First adhesive layer 730 and second adhesive layer 735 may be any suitable adhesive for joining the barrier layers to the tensile member layers. For example, in some embodiments, adhesive layer 730 and second adhesive layer 735 may include a hot melt adhesive. Adhesive layer 730 and second adhesive layer 735 are omitted from other drawings of the application for purposes of clarity.

For purposes of illustration, FIG. 7 shows a portion of chamber 440 corresponding with that shown in FIG. 6. In FIG. 7, however, chamber 440 is oriented in an opposite direction than in FIG. 6. That is, while the completed chamber may be oriented with the flex groove facing downward, as shown in FIG. 6, the chamber may be assembled upside down during the manufacturing process, as described further below.

In some embodiments, tensile member 455 may have two sections. As shown in FIG. 7, second tensile member layer 465 may be discontinuous between the two sections. For example, as shown in FIG. 7, second tensile member layer 465 may include a first portion 502 and a second portion 503 separate from first portion 502 by a gap 725. In contrast, first tensile member layer 460 may extend continuously between the first tensile member section and the second tensile member section, as shown in FIG. 7.

As shown in FIG. 7, a first process of the manufacturing method may utilize a first die set 700. First die set 700 may include a first die 705 and a second die 710. First die set 700 may be configured to draw first barrier layer 445 against first die 705 using vacuum pressure. For example, in some embodiments, first die 705 may include one or more air passages 711 through which air may be removed to create vacuum pressure (i.e., reduced pressure) in order to draw first barrier layer 445 against first die 705, thereby conforming first barrier layer 445 to the contours of first die 705. Similarly, second die 710 may include one or more air passages 712 through which air may be removed in order to draw second chamber barrier layer 450 against second die 710, thereby conforming second chamber barrier layer 450 to the contours of second die 710. For example, second die 710 may include an elongate projection 740. By drawing second chamber barrier layer 450 against second die 710, second chamber barrier layer 450 may conform to the contours of elongate projection 740.

Arranging the plurality of chamber components in a stacked arrangement may involve locating tensile member 455 between first chamber barrier layer 445 and second chamber barrier layer 450. The method may include placing the stacked arrangement of chamber components into first die set 700. In some embodiments, the stacked arrangement of chamber components may be placed within the die set together. In some embodiments, the stacked arrangement of chamber components may be individually inserted into the die set. For example, in some embodiments, first chamber barrier layer 445 may be drawn against first die 705 using vacuum pressure, and second chamber barrier layer 450 may be drawn against second die 710. Then, tensile member 455 may be placed between first chamber barrier layer 445 and second chamber barrier layer 450.

Figure 8:
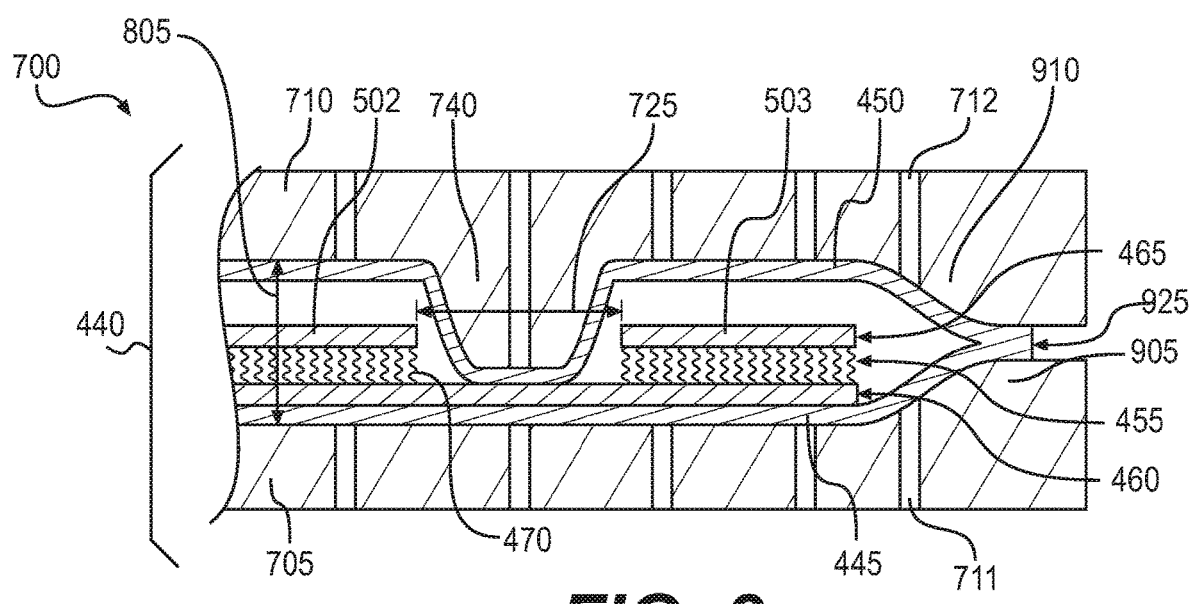
FIG. 8 shows a first process of a manufacturing method of forming the chamber shown in FIG. 6.

In some embodiments, the method of forming chamber 440 may include two processes. FIGS. 7 and 8 illustrate a first process of the method. The first process may include bonding first chamber barrier layer 445 to the second chamber barrier layer 450 to form peripheral portions of the chamber.

The first process may also include joining a portion of second chamber barrier layer 450 to first tensile member layer 460. In some embodiments, not only may the first die set be used to join the chamber barrier layers to the tensile member, but the first die set may also be used to seal the peripheral portions of the chamber barrier layers. First die 705 may include a first peripheral die projection 905 extending toward second die 710. Second die 710 may include a second peripheral die projection 910 extending toward first die 705. In some embodiments, the bonding and joining steps of the first process may be performed simultaneously in first die set 700 as part of the first process.

In order to perform these bonding and joining steps, the first process may include applying pressure to the stacked arrangement of chamber components to join portions of the chamber components to one another. For example, the method may include applying heat and pressure by compressing a stacked arrangement of components of chamber 440 between first die 705 and second die 710. This compression may be accomplished by applying force with first die 705 in a direction indicated by a first arrow 715 and by applying an opposite force with second die 710 in an opposite direction indicated by a second arrow 720.

FIG. 8 illustrates the use of first die set 700 to bond portions of the stacked arrangement of chamber components shown in FIG. 7. When pressure is applied with first die 705 and second die 710, elongate projection 740 may fixedly attach second chamber barrier layer 450 to first tensile member layer 460 in gap 725. As shown in FIG. 8, applying pressure to the stacked arrangement of chamber components with first die 705 and second die 710 may extend elongate projection 740 of second die 710 into gap 725 between first tensile member layer section 502 and second tensile member layer section 503 and presses second chamber barrier layer 450 against first tensile member layer 460.

In addition, as also shown in FIG. 8, when first die 705 and second die 710 are compressed together, a first peripheral barrier layer portion of first chamber barrier layer 445 may be compressed against and joined to a second peripheral barrier layer portion of second chamber barrier layer 450 between first peripheral die projection 905 and second peripheral die projection 910 to form a bonded peripheral edge 925 of chamber 440.

As shown in FIG. 8, the height of elongate projection 740 may be tall enough that, when elongate projection 740 engages against first tensile member layer 460, the opposing surfaces of first die 705 and second die 710 may be separated by a first distance 805. This distance 805 may be greater than the thickness of the stacked arrangement of chamber components. Accordingly, while second chamber barrier layer is held against second die 710, second tensile member layer 465 may rest on the bottom of the cavity within die set 700 under the influence of gravity. Therefore, in FIG. 8, tethers 470 are shown in an unextended or slackened condition. Because of this die set configuration, tensile member 455 is not bonded to first barrier layer 445 or second barrier layer 450 during this first process of the method of the manufacturing method of forming chamber 440.

In some embodiments, the first process may be a thermoforming process. Thermoforming is a manufacturing process where a plastic sheet is heated to a pliable forming temperature, formed to a specific shape in a mold, and trimmed to create a usable product. To complete the first process described above with thermoforming one or both of first die 705 and second die 710 may be heated.

Figure 9:
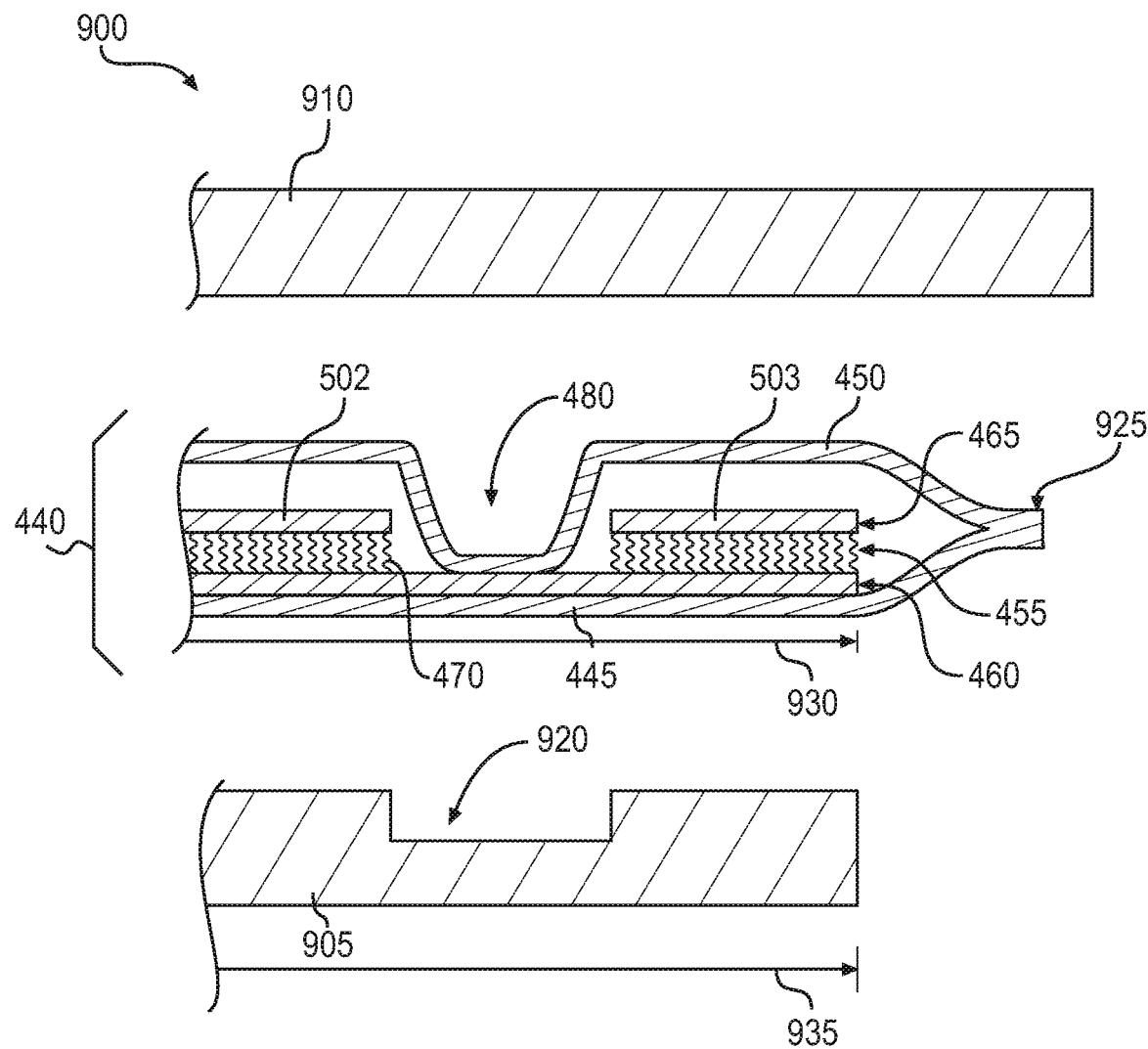
FIG. 9 shows a second process of a manufacturing method of forming the chamber shown in FIG. 6.

FIG. 9 shows a second process of a manufacturing method of forming the chamber shown in FIG. 6. As shown in FIG. 9, the second process may be completed by a second die set 900. Second die set 900 may include a third die 905 and a fourth die 910. FIG. 9 also shows chamber 440 after completion of the first process of the manufacturing method with second chamber barrier layer fixedly attached to first tensile member layer 460 and with bonded peripheral edge 925 formed by the welding of first chamber barrier layer 445 with second chamber barrier layer 450. Also, after completion of the first process, chamber 440 may have an elongate indentation, which may form a flex groove 480.

Figure 10:
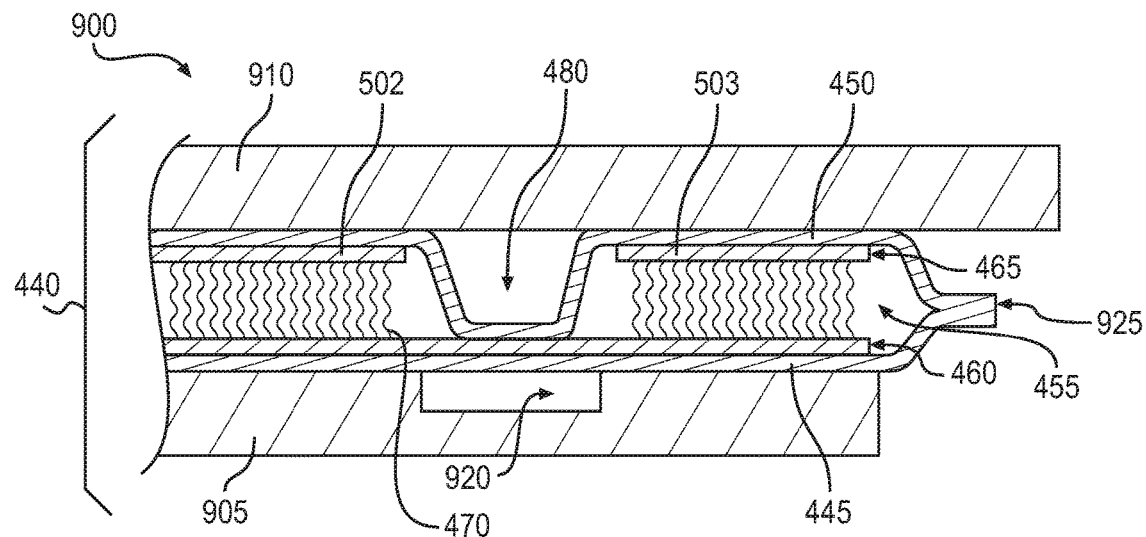
FIG. 10 shows a further stage of the second process shown in FIG. 9.

FIG. 10 shows a further stage of the second process shown in FIG. 9. FIG. 10 shows third die 905 and fourth die 910 being advanced toward one another to compress the chamber. Accordingly, the second process may include bonding first tensile member layer 460 to first chamber barrier layer 445. In addition, the second process may include bonding second tensile member layer 465 to second chamber barrier layer 450. Also, by compressing substantially the entire chamber, the steps of bonding first tensile member layer 460 to first chamber barrier layer 445 and bonding second tensile member layer 465 to second chamber barrier layer 450 are performed simultaneously in second die set 900 as part of the second process.

In some embodiments, third die 905 may include a die groove 920. During the second process, the flex groove 915 may be aligned with die groove 920. Accordingly, during the heating process, the bond that had already been formed between second chamber barrier layer 450 and first tensile member layer 460 would not be reheated significantly.

In some embodiments, the second process may utilize radiofrequency welding (RF welding) to perform the bonding steps of the second process. Radio frequency welding may also be referred to as "high frequency welding." Radio frequency welding uses electromagnetic energy and pressure to weld and permanently bond thermoplastic, vinyl and coated fabrics to fixedly attach two components by forming a new, permanent bond. When cooled, the newly formed bond is as strong as or even stronger than the original materials. By using radio frequency welding, the heating/welding can be targeted at particular portions of the stacked arrangement of chamber components without reheating welds that were formed in the first (thermoforming) process. For example, only the portions corresponding to the sections of second tensile member layer 465, and not at flex groove 915.

Figure 11:
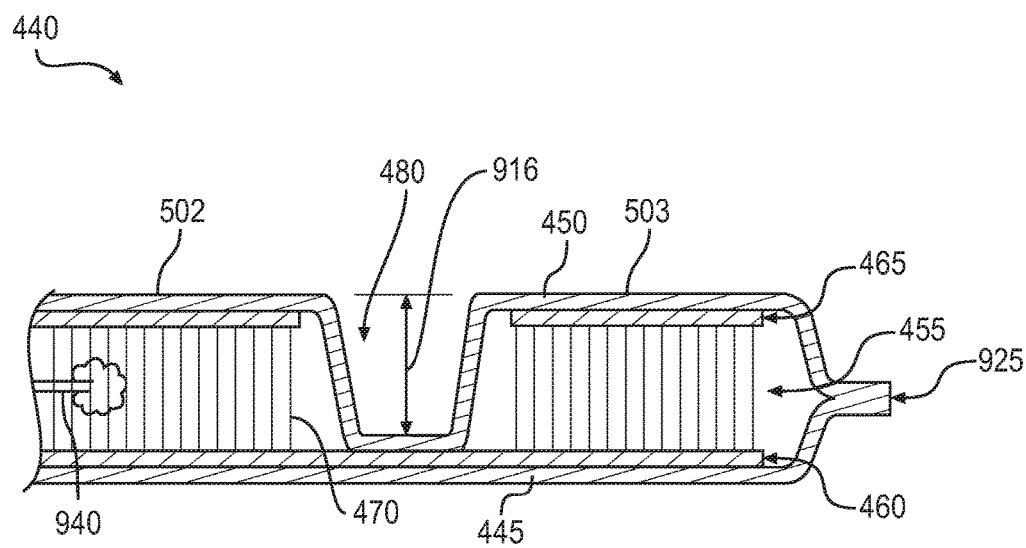
FIG. 11 shows a further step of the method of forming the chamber shown in FIG. 6.

FIG. 11 shows a further step of the method of forming the chamber shown in FIG. 6. As shown in FIG. 11, once the tensile member is bonded to the barrier layers of the chamber, the chamber may be inflated with a pressurized fluid. In some embodiments, the inflation may be performed while the chamber resides in the second die set.

As also shown in FIG. 11, in some embodiments, chamber 440 may be inflated with a pressurized fluid 940. In some embodiments, the injection of pressurized fluid 940 may be performed while chamber 440 is compressed within second die set 900. Upon pressurization, the top and bottom sides of chamber 440 may be extended up and down, respectively, increasing the height of the stacked arrangement of chamber components. This inflation of chamber 440 may extend tethers 470 and place tethers 470 in tension, as shown in FIG. 11.

Once the chamber is fully assembled, the method may include incorporating the chamber into the sole structure of the article of footwear. In addition, the method may include attaching the sole structure to the upper.

Figure 12:
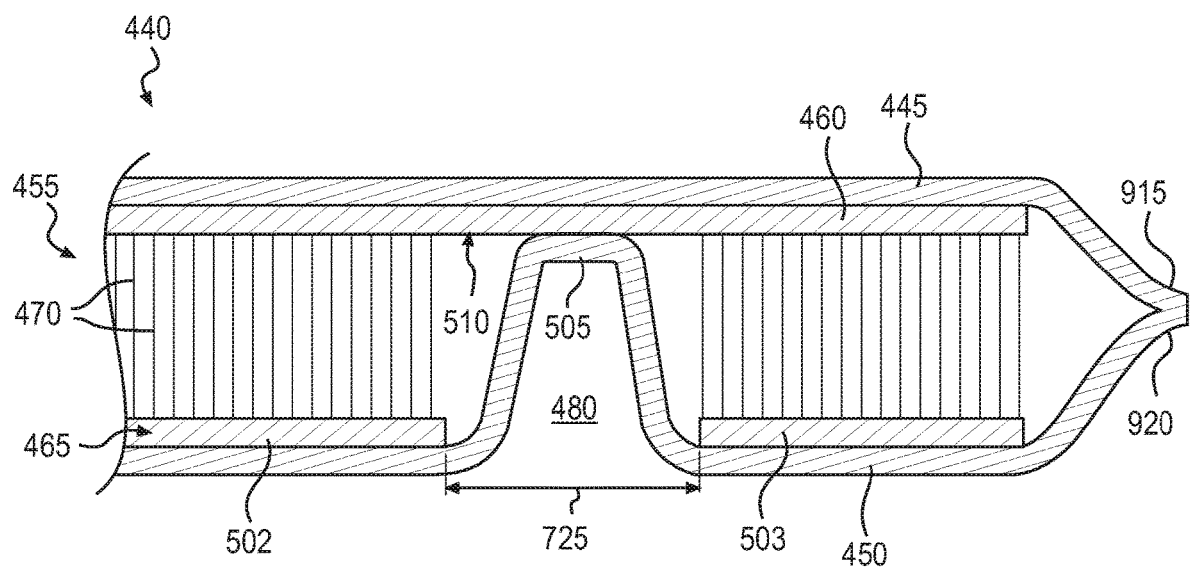
FIG. 12 shows an assembled, cross-sectional view of the chamber formed in the method shown in FIGS. 7-11.

FIG. 12 shows an assembled, cross-sectional view of the chamber formed in the method shown in FIGS. 7-11. That is, FIG. 12 illustrates chamber 440 after assembly using first die set 700 and second die set 900. As shown in FIG. 12, first peripheral barrier layer portion 915 of first chamber barrier layer 445 is joined to second peripheral barrier layer portion 920 of second chamber barrier layer 450. In some embodiments, the joinder of these portions of chamber 440 may form a flange, which may be trimmed after or during the sealing of first peripheral barrier layer portion 915 to second peripheral barrier layer portion 920.

Tethers 470 may extend across the interior void within chamber 440 and are placed in tension by the outward force of the pressurized fluid upon first chamber barrier layer 445 and second chamber barrier layer 450, thereby preventing chamber 440 from expanding outward and retaining the intended shape of chamber 440. Whereas the peripheral bond of first peripheral barrier layer portion 915 to second peripheral barrier layer portion 920 joins the polymer sheets to form a seal that prevents the fluid from escaping, tensile member 455 prevents chamber 440 from expanding outward or otherwise distending due to the pressure of the fluid. That is, tensile member 455 effectively limits the expansion of chamber 440 to retain an intended shape of surfaces of first chamber barrier layer 445 and second chamber barrier layer 450.

FIG. 12 illustrates chamber 440 right side up, with flex groove 480 facing downward as it may be when incorporated in an article of footwear. In this orientation, as shown in FIG. 12, a portion of the bottom barrier layer (i.e., second barrier layer 450) extends upward in the gap 725 between first tensile member layer section 502 and second tensile member layer section 503. Further, the bottom barrier layer (i.e., second barrier layer 450) is joined to the lower surface 510 of first tensile member layer 460.

In some embodiments, the chamber may be configured such that the chamber barrier layer may be angled in the area where it extends between sections of the tensile member. For example, in some embodiments, the portion of the lower chamber barrier layer that extends upward toward the upper tensile member layer may extend from the lower tensile member layer to the upper tensile member layer at an angle that is non-perpendicular with respect to the upper tensile member layer. Such an angled configuration may provide stability and control of shear forces within the chamber.

Figure 13:
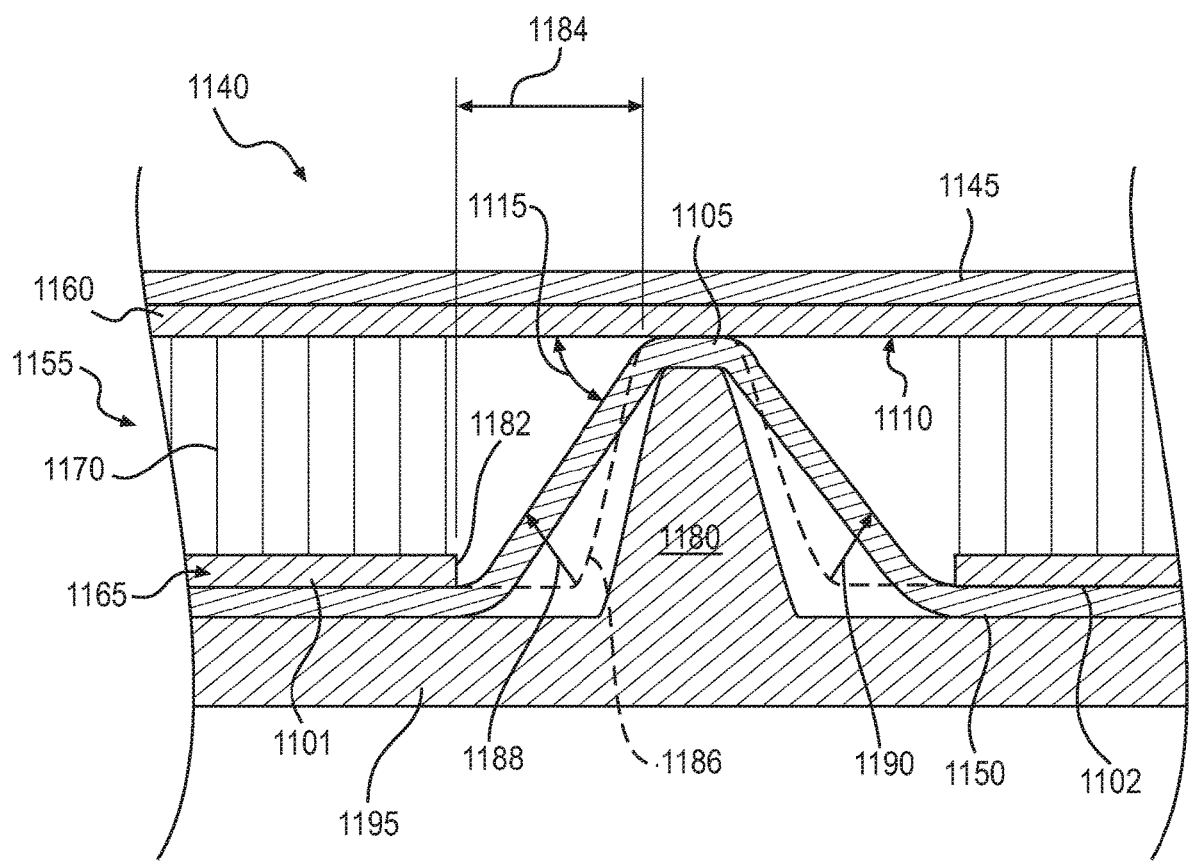
FIG. 13 shows an assembled, cross-sectional view of another exemplary fluid-filled chamber.

FIG. 13 shows a chamber 1140 including a first chamber barrier layer 1145 and a second chamber barrier layer 1150. Chamber 1140 may also include a tensile member 1155, which may include a first tensile member layer 1160 and a second tensile member layer 1165. A plurality of tethers 1170 may extend between first tensile member layer 1160 and second tensile member layer 1165. Second tensile member layer 1165 may include separate sections, such as a first tensile member layer section 1101 and a second tensile member layer section 1102. The characteristics of these components may be the same or similar to corresponding components of other embodiments discussed above.

As shown in FIG. 13, a portion 1105 of second chamber barrier layer 1150 may extend toward and be fixedly attached to a lower surface 1110 of first tensile member layer 1160, thus forming an elongate indentation 1180 in chamber 1140. As further shown in FIG. 13, at least one area of portion 1105 of second chamber barrier layer 1150 that extends toward first tensile member layer 1160 may extend from second tensile member layer 1165 to first tensile member layer 1160 at an angle 1115 that is non-perpendicular with respect to first tensile member layer 1160. That is, at least one area of the portion of the bottom barrier layer that extends upward in the gap between the first tensile member layer section and the second tensile member layer section extends from the second tensile member layer to the first tensile member layer at an angle that is non-perpendicular with respect to the first tensile member layer. Angle 1115 may be any suitable non-perpendicular angle. Smaller angles may provide the angled portion of second chamber barrier layer 1150 with a more horizontal configuration, thus providing greater amounts of stability and horizontal support.

When assembling the chamber, the distance between the bonded area between the chamber barrier layer and the tensile member layer and the edge of the tensile member layer adjacent the gap may be taken into consideration when sizing the first die set. In particular, the ratio between the height of the projection that extends into the gap and the height between the upper and lower dies of the first die set may determine how close to the edge of the second tensile member layer the bonded area between the second chamber barrier layer and the first tensile member layer may be formed. This ratio may influence the angle of the chamber barrier layer in the gap between sections of the tensile member layer.

Although FIG. 13 illustrates chamber 1140 fully assembled, For purposes of illustration, FIG. 13 shows a die 1195 in place for reference. For simplicity, the opposing die is not shown. Die 1195 includes a projection 1180, which may be used to extend second barrier layer 1150 into the gap and bond it to first tensile member layer 1160. During that process, second chamber barrier layer 1150 may be drawn tightly against die 1195, as shown by dashed line 1186. Once the die is removed, and chamber 1140 is inflated, second chamber barrier layer 1150 may be tightened and, therefore, move in a direction indicated by arrow 1188 and arrow 1190 to form the angled configuration of second chamber barrier layer 1150. The amount to which the barrier layer becomes angled depends on the ratio of the height of projection 1180 and the height between die 1195 and it's opposing die. The amount to which the barrier layer becomes angled may also depend on the distance 1184 between edge 1182 of second tensile member layer 1182 and the bonded area between second chamber barrier layer 1150 and first tensile member layer 1160. It will be noted that the dimensions and proportions shown in the drawings are schematic and not necessarily to scale.

In some embodiments where the gap between sections of the tensile member sections is smaller, the amount of the bottom chamber barrier layer that is unlined with tensile member is minimized. This may increase the structural integrity of the chamber, and simplify the construction of the assembly. For example, a smaller portion of the tensile member layer may be omitted/removed to create the gap between tensile member sections.

In order to narrow the distance between the bonded area between the second chamber barrier layer and the first tensile member layer and the edge of the second tensile member layer, more length of the second tensile member layer may be gathered during the first process of the manufacturing method. In particular, elongate recesses may be located on opposing sides of the projection. The second chamber barrier layer may be drawn into the elongate recesses, so that, when the chamber is assembled and inflated, there is more length of chamber barrier layer to form the walls of the flex groove.

Figure 14:
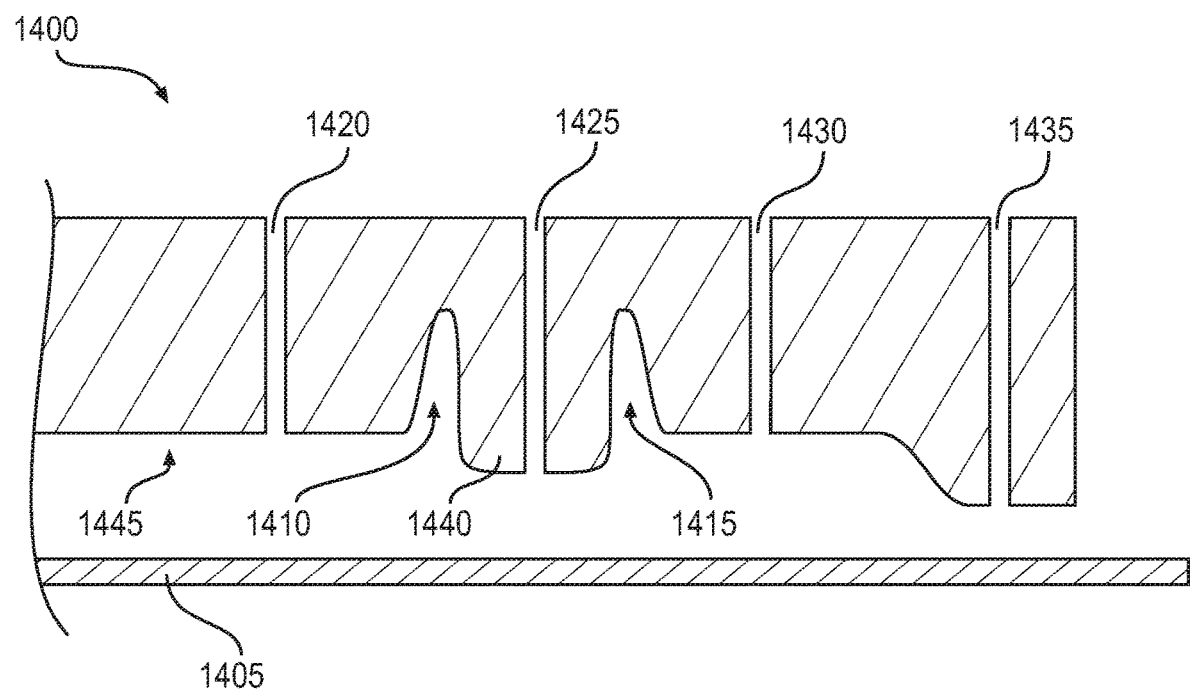
FIG. 14 shows another die configured to perform a portion of a method of forming a chamber.

FIG. 14 shows another die configured to perform a portion of a method of forming a chamber. For simplicity, FIG. 14 shows only a first die 1400 and a first chamber barrier layer 1405. As shown in FIG. 14, die 1400 may include one or more vacuum holes, through which air may be removed to create a vacuum pressure in order to draw first chamber barrier layer 1405 against a surface 1445 of die 1400. For example, die 1400 may include a first vacuum hole 1420, a second vacuum hole 1425, a third vacuum hole 1430, and a fourth vacuum hole 1435.

In some embodiments, surface 1445 may be a substantially planar die surface. Die 1400 may include an elongate projection 1440 for extending first chamber barrier layer 1405 into a gap between sections of a tensile member layer. In some embodiments, elongate projection 1440 may have a substantially trapezoidal cross-sectional shape, as also shown in FIG. 14. Further, die 1400 may include a first elongate recess 1410 adjacent elongate projection 1440. Die 1400 may also include a second elongate recess 1415 adjacent elongate projection 1440 on an opposite side of elongate projection 1440 from first elongate recess 1410.

Figure 15:
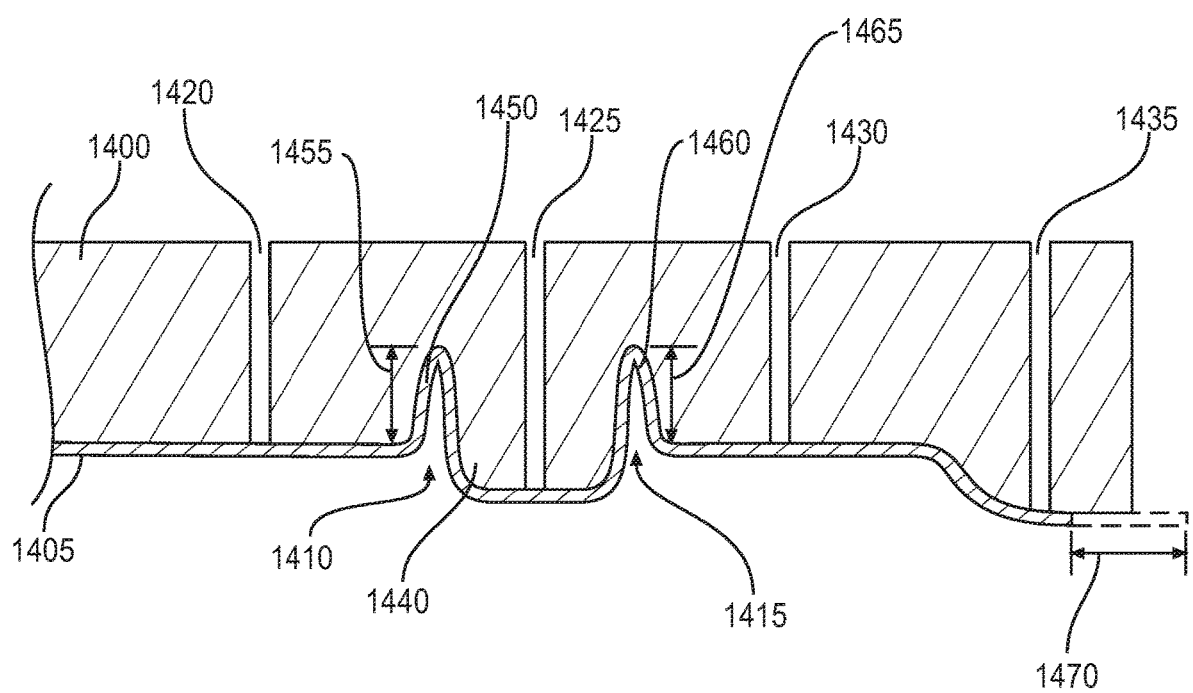
FIG. 15 shows the die of FIG. 14 with a chamber barrier layer drawn against it using vacuum pressure.

FIG. 15 shows the die of FIG. 14 with a chamber barrier layer drawn against it using vacuum pressure. That is, the method may include drawing first chamber barrier layer 1405 against die 1400 by creating a reduced pressure using a vacuum, so that first chamber barrier layer 1405 extends into first elongate recess 1410 and second elongate recess 1415. This collects extra length of first chamber barrier layer 1405 in a first portion 1450 and a second portion 1460. First portion 1450 provides additional length to the barrier layer that adds to the height of the flex groove that will be formed. This additional length is represented by first dimension 1455. Similarly, second portion 1460 provides additional length represented by second dimension 1465. As also shown in FIG. 15, the additional length drawn into first elongate recess 1410 and second elongate recess 1415 pulls first chamber barrier layer 1405 inward from its end points, as represented by a third dimension 1470.

Figure 16:
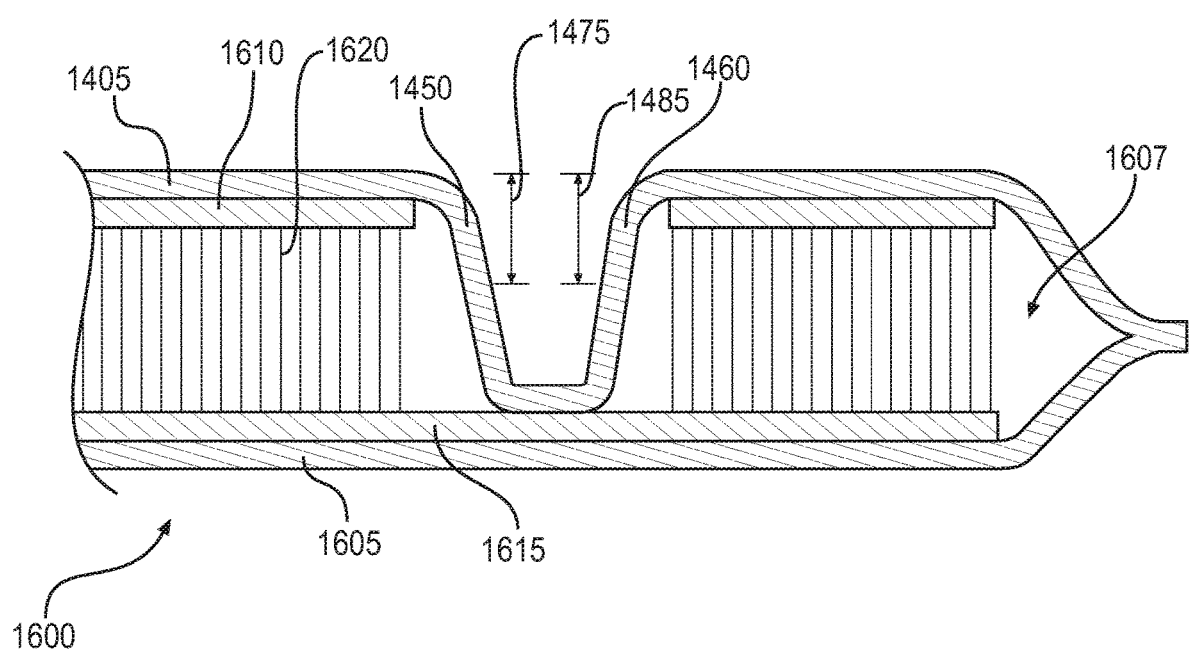
FIG. 16 shows an assembled, cross-sectional view of the chamber formed in the method shown in FIG. 15.

FIG. 16 shows an assembled and inflated chamber 1600 formed in the method including the process that is partially shown in FIG. 15. Chamber 1600 may include a second chamber barrier layer 1605. Also, chamber 1600 may include a tensile member 1607, which may include a first tensile member layer 1610 and a second tensile member layer 1615. Tensile member 1607 may include a plurality of tethers 1620. Extra height added to first chamber barrier layer 1405 by first elongate recess 1410 and second elongate recess 1415 is illustrated in FIG. 16 by first portion 1450 of first chamber barrier layer 1405. As shown in FIG. 16, first portion 1450 may have a first height 1475. In addition, second portion 1460 may have a second height 1485.

The added length provided to the chamber barrier layer in the flex groove may enable the edge of the tensile member to be closer to the bond between the barrier layer and the tensile member layer in the flex groove. In addition, if the height proportions between the elongate projection and the height of the first die set are selected accordingly, the chamber may be assembled using a single bonding process instead of two separate bonding processes. For example, in one step, in one die set, the first chamber barrier layer may be bonded to the second tensile member layer, the peripheral edges of the chamber barrier layers may be welded, and the tensile member layers may be bonded to the first chamber barrier layer and the second chamber barrier layer.

Figure 17:
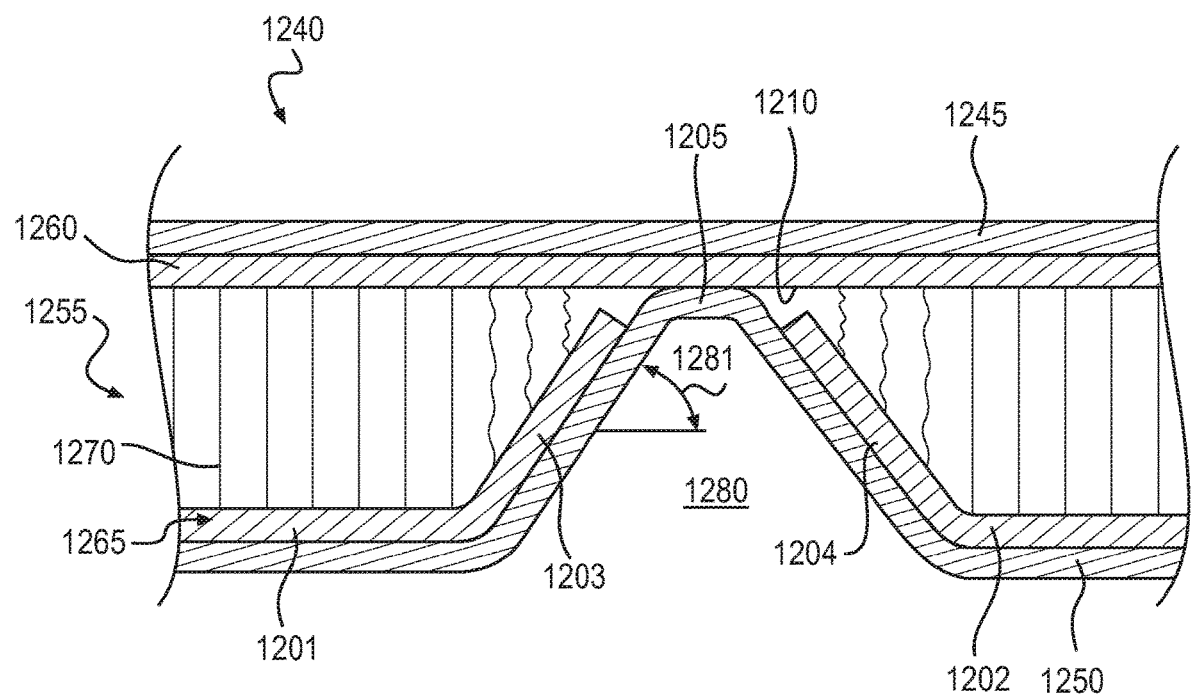
FIG. 17 shows an assembled, cross-sectional view of another exemplary fluid-filled chamber.
Figure 18:
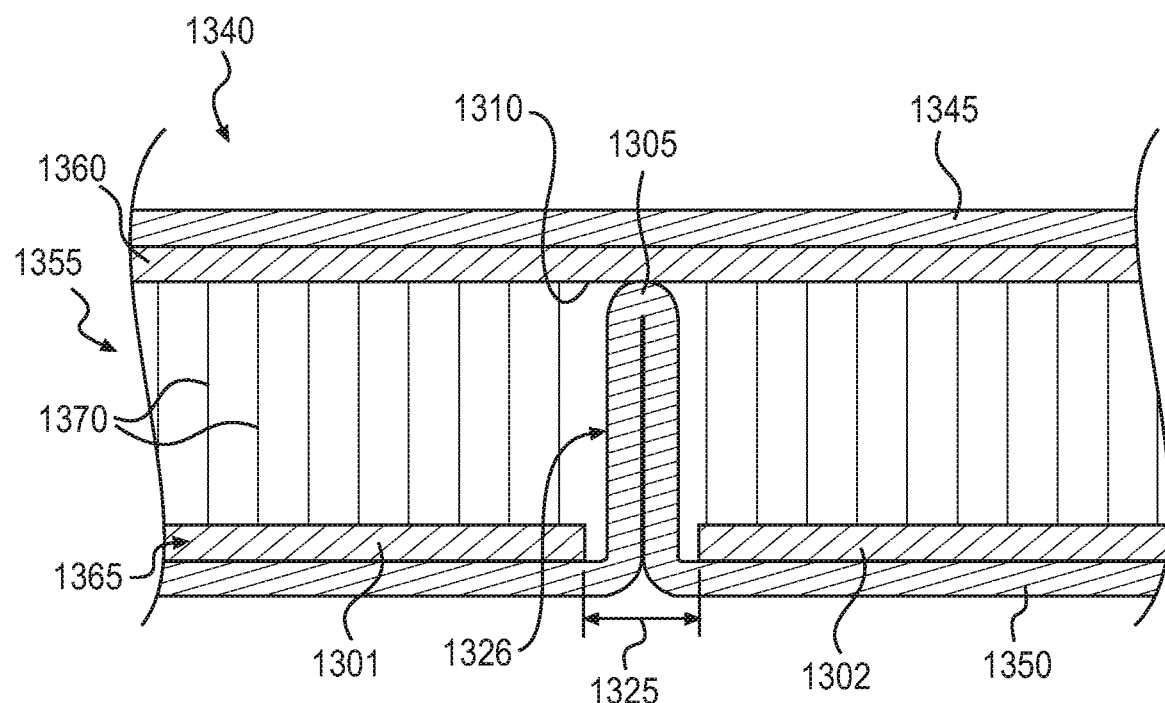
FIG. 18 shows an assembled, cross-sectional view of another exemplary fluid-filled chamber.
Figure 19:
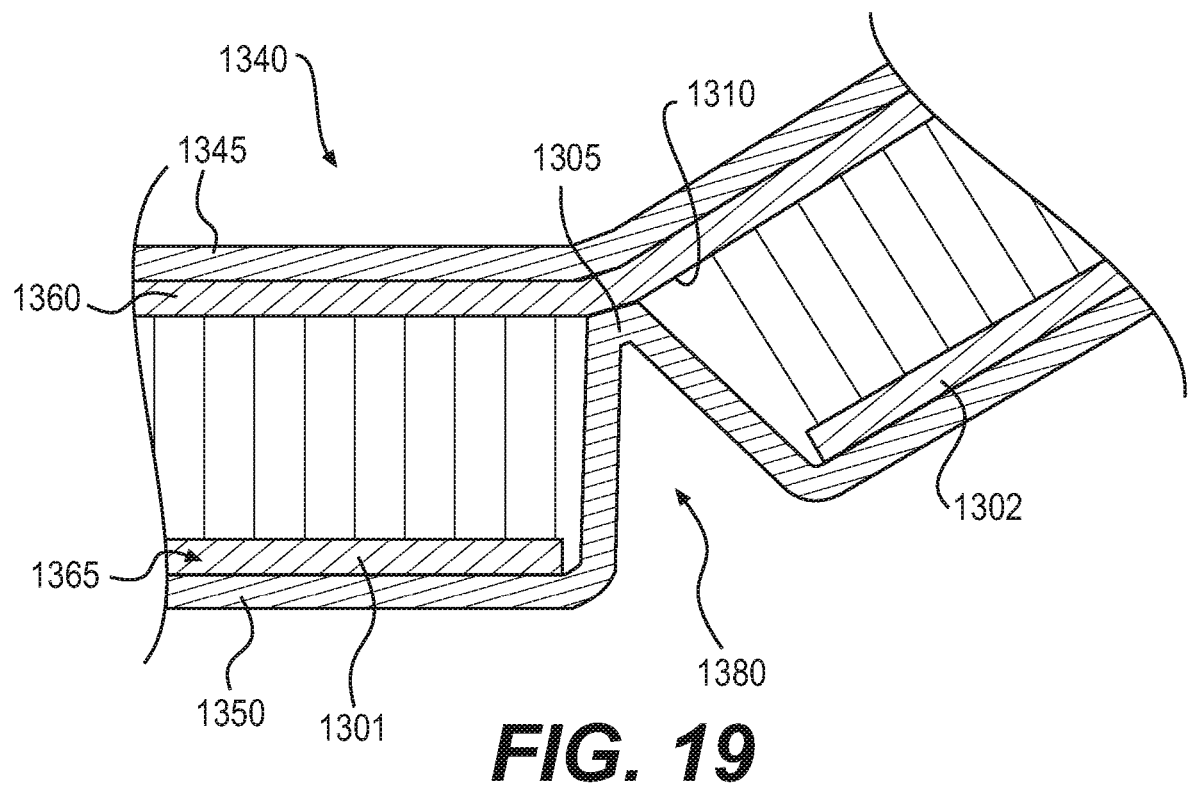
FIG. 19 shows the chamber of FIG. 18 in an articulated condition.

FIG. 17 shows an assembled, cross-sectional view of another exemplary fluid-filled chamber. In particular, FIG. 17 shows a chamber 1240 including a first chamber barrier layer 1245 and a second chamber barrier layer 1250. Chamber 1240 may also include a tensile member 1255, which may include a first tensile member layer 1260 and a second tensile member layer 1265. A plurality of tethers 1270 may extend between first tensile member layer 1260 and second tensile member layer 1265. Second tensile member layer 1265 may include separate sections, such as a first tensile member layer section 1201 and a second tensile member layer section 1202. The characteristics of these components may be the same or similar to corresponding components of other embodiments discussed above.

As shown in FIG. 17, a portion 1205 of second chamber barrier layer 1250 may extend toward and be fixedly attached to a lower surface 1210 of first tensile member layer 1260, thus forming an elongate indentation 1280 in chamber 1240. As further shown in FIG. 17, at least one area of portion 1205 of second chamber barrier layer 1250 that extends toward first tensile member layer 1260 may extend from second tensile member layer 1265 to first tensile member layer 1260 at an angle 1281 that is non-perpendicular with respect to first tensile member layer 1260. In addition, as also shown in FIG. 17, a first portion 1203 of second tensile member layer 1265 may be fixedly attached to the area portion 1205 of second chamber barrier layer 1250 that extends at non-perpendicular angle 1281. A second portion 1204 of second tensile member layer 1265 may be arranged similarly to first portion 1203. As shown in FIG. 17, in some embodiments, some of tethers 1270 that are attached to first portion 1203 and second portion 1204 may be less than fully extended when chamber 1240 is inflated.

It will also be noted that, although exemplary chambers disclosed herein are shown with the elongate indentations on a lower side, in some embodiments, the indentations may be provided on the upper side. Accordingly, in some embodiments, the upper barrier layer may extend downward toward, and join with, the lower tensile member layer. That is, the chambers may be configured with an arrangement that is essentially upside down from that shown in the accompanying figures. In such embodiments, with indentations on the upper side of the chamber, the indentations may enable articulation between sections of the chamber, while the thinner portions of the chamber (at the barrier layer/tensile member layer junction) act as living hinges. In some embodiments, the bonding of a portion of chamber barrier layer to an opposing portion of tensile member layer in a gap between sections of the tensile member may form opposing indentations or flex grooves in the chamber. For example, opposing flex grooves may extend into the top and bottom surfaces of the chamber.

In some configurations, the chamber may be formed without the elongate indentation where the lower chamber barrier layer extends upward to join to the upper tensile member layer. Such configurations may be used, for example, in footwear embodiments that do not include flex grooves in sole structure components. For instance, the midsole may include a continuous recess that is not broken up by elongate ribs corresponding with flex groove portions.

FIGS. 13 and 14 show a chamber 1340 including a first chamber barrier layer 1345 and a second chamber barrier layer 1350. Chamber 1340 may also include a tensile member 1355, which may include a first tensile member layer 1360 and a second tensile member layer 1365. A plurality of tethers 1370 may extend between first tensile member layer 1360 and second tensile member layer 1365. Second tensile member layer 1365 may include separate sections, such as a first tensile member layer section 1301 and a second tensile member layer section 1302. The characteristics of these components may be the same or similar to corresponding components of other embodiments discussed above.

As shown in FIG. 13, a portion 1305 of second chamber barrier layer 1350 may extend toward and be fixedly attached to a lower surface 1310 of first tensile member layer 1360. As further shown in FIG. 13, a portion 1326 of second chamber barrier layer 1350 may be substantially folded upon itself, thus substantially eliminating the space between chamber sections. This configuration enables the gap 1325 between first tensile member layer section 1301 and second tensile member layer section 1302 to be minimized.

As shown in FIG. 14, when chamber 1340 is articulated, the sections of chamber 1340 may hingedly rotate about the junction between portion 1305 of second chamber barrier layer 1350 and lower surface 1310 of first tensile member layer 1360. This hinge-like articulation may separate sections of chamber 1340, thereby forming an opening 1380. This configuration may be formed with a very narrow projection in the die, and with relatively deep elongate recesses on opposing sides of the projection.

It will be noted that the disclosed chamber configurations and tensile member arrangements may be implemented in articles other than footwear. For example, such chambers may be used for other articles such as garments and sporting equipment. In some cases, such chambers may be used to provide padding for sports garments, and the disclosed elongate indentations may provide flexibility that enables the padding to conform to the curvatures of various parts of the body. In other cases, such chambers may be used to provide padding in sports equipment, such as baseball gloves, catchers padding, lacrosse and football pads, and other such equipment. The flexibility of such chambers may enable such equipment to not only conform with the curvature of various parts of the body, but also to enable articulation of adjoined components of the equipment.

While various embodiments of the invention have been described, the description is intended to be exemplary, rather than limiting, and it will be apparent to those of ordinary skill in the art that many more embodiments and implementations are possible that are within the scope of the invention. Although many possible combinations of features are shown in the accompanying figures and discussed in this detailed description, many other combinations of the disclosed features are possible. Therefore, it will be understood that any of the features shown and/or discussed in the present disclosure may be implemented together in any suitable combination and that features of one embodiment may be implemented in other disclosed embodiments. Accordingly, the invention is not to be restricted except in light of the attached claims and their equivalents. Also, various modifications and changes may be made within the scope of the attached claims.

What is claimed is:

1. A method of making an article of footwear having an upper and a sole structure secured to the upper, the method comprising:
    forming a chamber for receiving a pressurized fluid by:
        assembling a stacked arrangement of chamber components including:
            a first chamber barrier layer;
            a second chamber barrier layer; and
            a tensile member extending between the first chamber barrier layer and the second chamber barrier layer, the tensile member including a first tensile member layer, a second tensile member layer, and a plurality of tethers connecting the first tensile member layer to the second tensile member layer, wherein the second tensile member layer includes a first section and a second section separate from the first section;
        bonding the first chamber barrier layer to the second chamber barrier layer to form peripheral portions of the chamber and to define an interior void between the first chamber barrier layer and the second chamber barrier layer; and
        extending a portion of the second chamber barrier layer toward the first tensile member layer between the first section of the second tensile member layer and the second section of the second tensile member layer, pressing the portion of the second chamber barrier layer against the first tensile member layer; and
        joining the portion of the second chamber barrier layer to the first tensile member layer between the first section of the second tensile member layer and the second section of the second tensile member layer;
        bonding the first tensile member layer to the first chamber barrier layer;
        bonding the second tensile member layer to the second chamber barrier layer;
    inflating the chamber with a pressurized fluid;
    incorporating the chamber into the sole structure; and
    attaching the sole structure to the upper.

2. The method of claim 1, wherein the steps of bonding the first chamber barrier layer to the second chamber barrier layer to form peripheral portions of the chamber and joining a portion of the second chamber barrier layer to the first tensile member layer are performed simultaneously in a first die set as part of a first process.

3. The method of claim 2, wherein the first die set includes a first die including a first peripheral die projection and a second die including a second peripheral die projection, configured to mate with the first peripheral die projection; and
    wherein bonding the first chamber barrier layer to the second chamber barrier layer to form peripheral portions of the chamber includes:
        placing a portion of the first chamber barrier layer and a portion of the second chamber barrier layer between the first peripheral die projection and the second peripheral die projection; and
        applying pressure to the first chamber barrier layer and the second chamber barrier layer between the first peripheral die projection and the second peripheral die projection.

4. The method of claim 3, wherein the second die includes a projection; and
    wherein joining a portion of the second chamber barrier layer to the first tensile member layer involves extending a portion of the second chamber barrier layer toward the first tensile member layer using the projection by advancing the first die and the second die toward one another to extend the projection between the first section of the second tensile member layer and the second section of the second tensile member layer and press the portion of the second chamber barrier layer toward and against the first tensile member layer.

5. The method of claim 4, wherein the second die includes a first recessed portion adjacent the projection, the method further including:
    drawing the second chamber barrier layer against the second die by creating a reduced pressure using a vacuum, so that the second chamber barrier layer extends into the first recessed portion adjacent the projection.

6. The method of claim 5, wherein the second die includes a second recessed portion adjacent the projection and located on an opposite side of the projection from the first recessed portion, and
    wherein drawing the second chamber barrier layer against the second die extends the second chamber barrier layer into the second recessed portion of the second die.

7. The method of claim 4, wherein the projection is an elongate projection; and wherein the step of joining the portion of the second chamber barrier layer to the first tensile member layer by extending the portion of the second chamber barrier layer toward the first tensile member layer using the elongate projection forms an elongate flex groove in the chamber.

8. The method of claim 2, wherein the steps of bonding the first tensile member layer to the first chamber barrier layer and bonding the second tensile member layer to the second chamber barrier layer are performed simultaneously in a second die set as part of a second process.

9. The method of claim 8, wherein the first process is a thermoforming process; and
wherein the second process utilizes radiofrequency welding to perform the bonding steps of the second process.

10. The method of claim 1, wherein the second tensile member layer is discontinuous such that the first tensile member layer section is separated from the second tensile member layer section by a gap.

11. The method of claim 1, wherein the portion of the second chamber barrier layer is joined to a first side of the first tensile member layer and the first chamber barrier layer is bonded to a second side of the first tensile member layer.

12. A method of making a sole structure for an article of footwear, including forming a chamber for receiving a pressurized fluid, comprising:
assembling a stacked arrangement of chamber components including:
a first chamber barrier layer;
a second chamber barrier layer; and
a tensile member extending between the first chamber barrier layer and the second chamber barrier layer, the tensile member including a first tensile member layer, a second tensile member layer, and a plurality of tethers connecting the first tensile member layer to the second tensile member layer, wherein the second tensile member layer is discontinuous such that a first section of the second tensile member layer is separated from a second section of the second tensile member layer by a gap;
bonding the first chamber barrier layer to the second chamber barrier layer to form peripheral portions of the chamber and to define an interior void between the first chamber barrier layer and the second chamber barrier layer; and
extending a portion of the second chamber barrier layer toward the first tensile member layer in the gap between the first section of the second tensile member layer and the second section of the second tensile member layer, pressing the portion of the second chamber barrier layer against the first tensile member layer; and
joining the portion of the second chamber barrier layer to the first tensile member layer between the first section of the second tensile member layer and the second section of the second tensile member layer;
bonding the first tensile member layer to the first chamber barrier layer;
bonding the second tensile member layer to the second chamber barrier layer; and
inflating the chamber with a pressurized fluid.

13. The method of claim 12, wherein the steps of bonding the first chamber barrier layer to the second chamber barrier layer to form peripheral portions of the chamber and joining a portion of the second chamber barrier layer to the first tensile member layer are performed simultaneously in a first die set as part of a first process.

14. The method of claim 13, wherein the first die set includes a first die and a second die;
wherein the second die includes a projection; and
wherein joining a portion of the second chamber barrier layer to the first tensile member layer involves extending a portion of the second chamber barrier layer toward the first tensile member layer using the projection by advancing the first die and the second die toward one another to extend the projection into the gap between the first section of the second tensile member layer and the second section of the second tensile member layer and press the portion of the second chamber barrier layer toward and against the first tensile member layer.

15. The method of claim 14, wherein the projection is an elongate projection; and
wherein the step of joining the portion of the second chamber barrier layer to the first tensile member layer by extending the portion of the second chamber barrier layer toward the first tensile member layer using the elongate projection forms an elongate flex groove in the chamber.

16. The method of claim 13, wherein the steps of bonding the first tensile member layer to the first chamber barrier layer and bonding the second tensile member layer to the second chamber barrier layer are performed simultaneously in a second die set as part of a second process.

17. The method of claim 16, wherein the first process is a thermoforming process; and
wherein the second process utilizes radiofrequency welding to perform the bonding steps of the second process.

18. The method of claim 12, wherein the portion of the second chamber barrier layer is joined to a first side of the first tensile member layer and the first chamber barrier layer is bonded to a second side of the first tensile member layer.

19. A method of making a sole structure for an article of footwear, including forming a chamber for receiving a pressurized fluid, comprising:
assembling a stacked arrangement of chamber components including:
a first chamber barrier layer;
a second chamber barrier layer; and
a tensile member extending between the first chamber barrier layer and the second chamber barrier layer, the tensile member including a first tensile member layer, a second tensile member layer, and a plurality of tethers connecting the first tensile member layer to the second tensile member layer, wherein the second tensile member layer is discontinuous such that a first section of the second tensile member layer is separated from a second section of the second tensile member layer by a gap;
bonding the first chamber barrier layer to the second chamber barrier layer to form peripheral portions of the chamber and to define an interior void between the first chamber barrier layer and the second chamber barrier layer; and
extending a portion of the second chamber barrier layer toward the first tensile member layer in the gap between the first section of the second tensile member layer and the second section of the second tensile member layer, pressing the portion of the second chamber barrier layer against the first tensile member layer; and
joining the portion of the second chamber barrier layer to the first tensile member layer; and
inflating the chamber with a pressurized fluid.

20. The method of claim 19, wherein the projection is an elongate projection; and
 wherein the step of joining the portion of the second chamber barrier layer to the first tensile member layer by extending the portion of the second chamber barrier layer toward the first tensile member layer using the elongate projection forms an elongate flex groove in the chamber.

21. The method of claim 20, wherein the first process is a thermoforming process.

22. The method of claim 21, further including a second process involving bonding the first chamber barrier layer to the first tensile member layer and bonding the second chamber barrier layer to the second tensile member layer;
 wherein the bonding steps of the second process are performed by radiofrequency welding.

23. The method of claim 19, wherein the portion of the second chamber barrier layer is joined to a first side of the first tensile member layer and the first chamber barrier layer is bonded to a second side of the first tensile member layer.

* * * * *